United States Patent
Nicola et al.

(10) Patent No.: US 7,740,775 B2
(45) Date of Patent: Jun. 22, 2010

(54) METHOD FOR THE PRODUCTION OF PARTICLES

(75) Inventors: Mazin Nicola, Worthing (GB); Neale Gray, Brighton (GB)

(73) Assignee: Glaxo Group Limited, Greenford, Middlesex (GB)

( * ) Notice: Subject to any disclaimer, the term of this patent is extended or adjusted under 35 U.S.C. 154(b) by 0 days.

(21) Appl. No.: 10/494,962

(22) PCT Filed: Nov. 7, 2002

(86) PCT No.: PCT/GB02/05017

§ 371 (c)(1),
(2), (4) Date: May 7, 2004

(87) PCT Pub. No.: WO03/039729

PCT Pub. Date: May 15, 2003

(65) Prior Publication Data

US 2004/0266892 A1 Dec. 30, 2004

(30) Foreign Application Priority Data

Nov. 7, 2001 (GB) .................................. 0126716.0

(51) Int. Cl.
*B29B 9/00* (2006.01)
*A61K 9/14* (2006.01)
*B01D 11/04* (2006.01)

(52) U.S. Cl. .............................. 264/5; 264/11; 264/12; 264/13; 264/14; 424/489; 424/499; 424/501; 23/297; 23/299; 422/256; 426/429

(58) Field of Classification Search ................... 516/20, 516/139; 264/5, 11, 12
See application file for complete search history.

(56) References Cited

U.S. PATENT DOCUMENTS

| 5,043,280 | A | * | 8/1991 | Fischer et al. ............. 435/235.1 |
| 5,639,441 | A | * | 6/1997 | Sievers et al. ................ 424/9.3 |
| 5,766,637 | A | * | 6/1998 | Shine et al. .................. 424/497 |
| 5,770,559 | A | * | 6/1998 | Manning et al. ................ 514/2 |
| 5,833,891 | A | * | 11/1998 | Subramaniam et al. ........ 264/7 |
| 6,114,414 | A | * | 9/2000 | Daly et al. .................. 523/330 |
| 6,224,847 | B1 | * | 5/2001 | Powell et al. ............. 423/658.5 |
| 6,475,524 | B1 | * | 11/2002 | Bisrat et al. .................. 424/489 |
| 6,589,422 | B2 | * | 7/2003 | Low ........................... 210/259 |
| 6,913,779 | B2 | * | 7/2005 | Colombo et al. ........... 427/2.24 |

(Continued)

FOREIGN PATENT DOCUMENTS

GB 638564 A * 6/1950

OTHER PUBLICATIONS

WO 01/36078 A1: Nicola, Method for the Production of Particles, May 25, 2001.*

*Primary Examiner*—Jeffrey Wollschlager
(74) *Attorney, Agent, or Firm*—Dara L. Dinner; Theodore R. Furman

(57) ABSTRACT

A process for preparing particles of a substance comprising contacting a first formulation including a first substance with a first solvent stream and a second solvent stream, thereby causing formation of particles of the first substance, wherein both the first and second solvent streams are in a non-supercritical state, and subjecting the resultant mixture to a separation process which causes separation of the first substance from the first and second solvent streams.

60 Claims, 13 Drawing Sheets

U.S. PATENT DOCUMENTS 7,108,867 B2 * 9/2006 Sundholm et al. ............ 424/490
7,235,260 B2 * 6/2007 Crew et al. .................. 424/489
7,404,828 B1 * 7/2008 Nicola ......................... 23/297

* cited by examiner

METHOD FOR THE PRODUCTION OF PARTICLES

CROSS REFERENCE TO RELATED APPLICATION

This application is a 35 USC §371 National Phase Entry Application from PCT/GB02/05017, filed Nov. 7, 2002, and designating the U.S.

The present invention relates to the production of particles and, in particular, but not exclusively, to the production of particles having a controlled size and/or defined crystalline form.

Many industries require that their solid particulate raw materials meet rigorous specifications as to size and shape. Some require very small particles or crystals with closely defined limitations as to the range of size and shape.

In the food industry, it would be advantageous to obtain raw materials as solid particulate powders having very small, narrowly distributed mesh sizes in order to distribute more evenly the flavour ingredient throughout their prepared foodstuff products.

Industries concerned with colour in the form of dye-stuffs and pigments need small, uniform, closely defined particulate materials, to distribute better and more evenly such dyes and pigments in suspension or solution throughout their paints, printing inks and textile printing media.

The plastics industry also has need for very small particles of a variety of polymeric materials such as polystyrene, polyvinyl chloride, polyacrylamide etc.

The property known as polymorphism is the ability of crystalline materials to exist in a variety of forms or structures despite being chemically indistinguishable from each other. The crystalline form or structure may have an effect on the properties of the material. In view of this, in addition to the control of the particle size (mesh) of their raw materials, some industries require crystals of very well defined shape to the rigorous exclusion of similarly sized crystals of other shapes.

The chemical and pharmaceutical industries have a particular demand for small particles for a wide range of applications. For example, small particle size raw ingredients and intermediates are advantageous for their increased ease of dissolution, enhanced chemical reactivity and increased ease of drying.

The pharmaceutical industry in particular has a significant requirement for use of particles of controlled size in drug formulations. There are several methods available for provision of controlled drug delivery systems. Particle size and crystal form are important characteristics affecting the performance and efficacy of ingested pharmaceuticals, whether as tablets, powders or suspensions. Small particles of microcrystalline form, due to their large surface area, are absorbed more quickly than larger particles and hence have a faster activity. The reverse is also true. Therefore, the release rate of active ingredients can be controlled by controlling the size of the particles from which the pharmaceutical is made.

Particle size control is also important in situations where a drug is delivered through the skin in, for example, the provision of painkillers and vaso-dilators, such as capsicum extracts, used as a means of treating and accelerating the healing of sprains and muscular damage.

Suppositories, which depend for their efficacy on the ability of the active pharmaceutical to penetrate through the rectal mucosa, have proved to be a valuable means for the administration of drugs. The opinion that "skin-patches" comprising or impregnated with pharmaceutically active compounds may have considerable advantages has been growing in popularity in recent years. Hormone replacement therapy patches and nicotine patches are now a widely used and effective means for the delivery of active molecules through the epidermis.

In some applications where prolonged drug delivery is desired, such as in certain common cold preparations, a mixture of variously sized particles is used in order that the therapeutic benefits last for extended periods of time.

Traditional methods for producing solid particles include milling or grinding, freeze grinding and spray drying. However, these techniques suffer from various disadvantages such as destruction of the crystalline form of material, the introduction of heat energy which may cause the active ingredient, such as a pharmaceutically active agent, to decompose and exposure to air which may result in the oxidation of a component.

In recent years, techniques for producing solid particles employing a supercritical fluid, particular supercritical carbon dioxide, have been under intense scrutiny by many industries.

These techniques rely on the peculiar properties of a fluid, such as carbon dioxide, in a supercritical state (i.e. a fluid that is simultaneously at a temperature above its critical temperature (31° C. for carbon dioxide) and at a pressure above its critical pressure (74 bar for carbon dioxide)) to mix with, disperse and extract almost simultaneously a vehicle containing a substance, thereby forming small particles of the substance. To use this procedure for forming very small particles, a formulation stream comprising a substance (e.g. an active pharmaceutical agent) in a vehicle is fed to a chamber capable of withstanding pressures in excess of 300 to 500 bar. The chamber is pressurised substantially in excess of the critical pressure of the supercritical fluid (for instance 100 to 300 bar for carbon dioxide) and maintained at a temperature above the critical temperature of the supercritical fluid (e.g. 40-60° C. for carbon dioxide). The formulation stream is contacted with a high velocity flow of the supercritical fluid (e.g. carbon dioxide at a temperature of 40 to 60° C. and a pressure of 100 to 300 bar). The high velocity supercritical fluid instantaneously mixes with the formulation stream, breaks it up into droplets and substantially simultaneously extracts the vehicle from the formulation stream, thereby forming particles of the solid previously held in the vehicle.

One major drawback of using fluids in a supercritical state is its cost; the capital cost of the various chambers, pumps, nozzles, heat exchangers, etc., all of which must be capable of withstanding and functioning under extremely high pressures. Furthermore, carbon dioxide, which is the preferred supercritical fluid of choice, is acidic in the presence of water. Consequently, supercritical carbon dioxide may cause a reduction in pH of the substance to unacceptably low levels, for example by reacting with the water of crystallisation of the substance. Hence, if the substance is unstable at acidic pH, this may preclude the use of supercritical carbon dioxide.

In an attempt to overcome the aforementioned disadvantages of using fluids in a supercritical state, particularly supercritical carbon dioxide, alternative procedures using fluids in a non-supercritical state for producing particles having a controlled size and/or defined crystalline form have been investigated, such as that disclosed in International patent application PCT/GB00/04350 by Advanced Phytonics Limited. A particular method disclosed in this patent application involves contacting a formulation containing a substance and a carrier solvent, such as an organic carrier solvent, with a liquefied hydrofluorocarbon solvent in a non-supercritical state. Suitably, the carrier solvent is extracted into the hydrofluorocarbon which causes the substance to precipitate as solid particles. Although this method has gone some way to solving the problems associated with producing particles having a controlled size and/or defined crystalline form using fluids in a non-supercritical state, typically it is necessary to have a prolonged contact time between the hydrofluorocarbon and the formulation so that particles of an acceptable size are produced at the specified collection point. This reduces the throughput and consequently the commercial viability of the process.

The present invention seeks to solve the aforementioned technical problems with producing solid particles using a fluid in a non-supercritical state.

According to a first aspect, the present invention provides a process for preparing particles of a substance comprising contacting a first formulation including a first substance with a first solvent stream and a second solvent stream, thereby causing formation of particles of the first substance, wherein both the first and second solvent streams are in a non-supercritical state, and subjecting the resultant mixture to a separation process which causes separation of the first substance from the first and second solvent streams. Such a process is referred to hereinafter as the process of the present invention.

By the term "both the first and second solvent streams are in a non-supercritical state" we mean that the first solvent stream is not at or above its critical temperature and critical pressure simultaneously, and the second solvent stream is not at or above its critical temperature and critical pressure simultaneously.

The process of the present invention addresses the aforementioned technical problems associated with producing solid particles, in particular producing solid particles using a solvent stream that is in a non-supercritical state. Unexpectedly, we have identified that a major problem of producing small particles of a substance from a formulation using a solvent stream in a non-supercritical state is, at least in part, due to the inability of the solvent stream to rapidly mix and/or disperse with the formulation carrier solvent prior to extraction of the carrier solvent. In particular, if effective dispersion of the solvent stream and the formulation carrier solvent is not achieved then this may result in precipitation of comparatively large particles of the substance from the formulation and/or precipitation of the substance after the desired collection point e.g. a filter in the apparatus. Typically, in order to promote dispersion and/or mixing of a solvent stream in a non-supercritical state with the formulation carrier solvent it is necessary to mix the solvent stream and the formulation for relatively long periods of time. Unexpectedly, we have found that by contacting a formulation including a substance with a first and second solvent stream, both of which are in a non-supercritical state, promotes improved mixing and/or dispersion of the solvent streams with the formulation carrier solvent, compared with prolonged contact of a formulation stream with a single solvent stream in a non-supercritical state. Moreover, mixing and/or dispersion of the solvent streams with the formulation carrier solvent may occur immediately prior to or substantially simultaneously to extraction of the formulation carrier solvent into the solvent streams. In other words, the process of the present invention permits greatly improved physical inter-dispersion of very small droplets of both a solvent stream in a non-supercritical state and a formulation carrier solvent.

Consequently, the process of the present invention using solvent streams in a non-supercritical state may be used to form relatively small particles of the substance at the desired collection point, compared with a comparable process including a single solvent stream in a non-supercritical state, without the requirement of mixing the solvent streams with the formulation stream for a relatively long period of time. Thus the throughput of the process compared with a comparable process including a single solvent stream in a non-supercritical state may be substantially increased, thereby increasing the commercial viability of the process.

Although only theory, it is believed that a solvent stream in a non-supercritical state typically has a relatively high specific density, high surface tension and low diffusibility which inhibits mixing and/or dispersion with another solvent, compared with a solvent stream in a supercritical state which exhibits excellent dispersion and mixing characteristics. It is believed that the use of two solvent streams in a non-supercritical state may modify the physical properties, such as specific density and surface tension, of a formulation stream so that they are similar to those of the solvent streams, thereby promoting more efficient mixing and dispersion of the formulation and the solvent streams.

According to a preferred embodiment of the present invention, the first formulation is contacted initially with the first solvent stream to form a mixture of the first formulation and first solvent stream, and the mixture of the first formulation and first solvent stream is then contacted with the second solvent stream to cause formation of particles of the first substance, and the resultant mixture is subjected to a separation process thereby causing separation of the first substance from the first and second solvent streams.

Unexpectedly, we have found that initial contact between the first formulation and the first solvent stream to form a mixture of the first formulation and the first solvent stream may promote increased mixing and dispersion of the second solvent stream with the mixture of the first formulation and the first solvent stream. Moreover, the mixing and dispersion of the second solvent stream with the mixture of the first formulation and the first solvent stream may occur immediately prior to or substantially simultaneously to extraction of the formulation carrier solvent into the first and second solvent streams, thereby causing formation of relatively small particles of the first substance at the desired collection point, without the requirement of mixing the first formulation with the solvent streams for relatively long periods of time.

Although only theory, it is believed that the first formulation stream is diluted and its physical properties are modified by contact with the first solvent stream, so that the resultant mixture has a specific density and surface tension similar to the second solvent stream, thereby promoting more efficient mixing and dispersion with the second solvent stream. It appears that the modification of the physical properties of the formulation by the first solvent stream is the overriding influence of promoting mixing with the second solvent stream.

Preferably, the first formulation is contacted with a sufficient amount of the first solvent stream to prevent formation of particles of the substance, or permit partial particle formation, but promote efficient mixing and dispersion of the combined formulation and first solvent streams with the second solvent stream.

The amount of the first formulation that is contacted with the first solvent stream is dependent on, amongst other things, the first substance of the formulation, the formulation carrier solvent and the composition of the first solvent stream. The preferred amount of the first solvent stream to be contacted with the first formulation may be determined by routine experimental techniques. In certain circumstances greater than 10 volumes of the first solvent stream may be contacted with the first formulation.

Preferably, one volume of the formulation is contacted with less than or equal to 10 volumes of the first solvent stream, more preferably less than or equal to 7 volumes of the first solvent stream, most preferably less than or equal to 5 volumes of the first solvent stream.

Preferably, one volume of the formulation is contacted with greater than or equal to 1 volume of the first solvent stream, more preferably greater than or equal to 2 volumes of the first solvent stream, most preferably greater than or equal to 3 volumes of the first solvent stream.

Preferably, the combined first solvent stream and formulation is contacted with less than or equal to 25 volumes of the second solvent stream, more preferably less than or equal to 20 volumes of the second solvent stream, most preferably less than or equal to 15 volumes of the second solvent stream.

Preferably, the combined first solvent stream and formulation is contacted with greater than or equal to 8 volumes of the second solvent stream, more preferably greater than or equal to 10 volumes of the second solvent stream, most preferably greater than or equal to 12 volumes of the second solvent stream.

Similarly, the preferred amount of the combined first solvent stream and formulation to be contacted with the second solvent stream may be determined by routine experimental techniques.

According to another embodiment of the present invention, the first formulation is contacted simultaneously with both the first and second solvent streams thereby forming particles of the first substance, and the resultant mixture is subjected to a separation process thereby causing separation of the first substance from the first and second solvent streams.

A further preferred embodiment of the present invention, further includes the step of contacting the first formulation including the first substance, the first and second solvent streams with a second formulation including a second substance thereby forming particles of the first substance and the second substance, and subjecting the resultant mixture to a separation process thereby causing separation of the first and second substances from the first and second solvent streams.

Suitably, when a second formulation is employed in the process of the present invention, the first formulation is contacted with the first solvent stream to form a mixture of the first formulation and first solvent stream, the mixture of the first formulation and the first solvent stream is then contacted with the second formulation and the second solvent stream thereby causing formation of particles of the first substance and second substance, and the resultant mixture is subjected to a separation process thereby causing separation of the first and second substances from the first and second solvent streams.

Preferably, the mixture of the first formulation and the first solvent stream is contacted simultaneously with both the second formulation and the second solvent stream.

Preferably, the second formulation is contacted with the second solvent stream to form a mixture of the second formulation and the second solvent stream, and the mixture of the second formulation and the second solvent stream is then contacted with the mixture of the first formulation and the first solvent stream thereby causing formation of particles of the first substance and the second substance, and the resultant mixture is subjected to a separation process thereby causing separation of the first and second substances from the first and second solvent streams.

Suitably, when a second formulation is employed in the process of the present invention, the first formulation is contacted with the first solvent stream and the second formulation to form a mixture of the first formulation, second formulation and first solvent stream, the mixture of the first formulation, second formulation and first solvent stream is then contacted with the second solvent stream thereby causing formation of particles of the first and second substances, and the resultant mixture is subjected to a separation process thereby causing separation of the first and second substances from the first and second solvent streams.

Where a second formulation is employed in the process of the present invention, a further preferred embodiment of the present invention further includes the step of contacting the first formulation, the second formulation, the first solvent stream and the second solvent stream with a third solvent stream in a non-supercritical state thereby causing precipitation of the first and second substances, and subjecting the resultant mixture to a separation process thereby causing separation of the first and second substances from the first, second and third solvent streams.

Preferably, where a third solvent stream is employed in the process of the present invention, the first formulation is contacted with the first and second solvent streams in accordance with the embodiments described hereinbefore to form a mixture of the first formulation, first and second solvent streams, the second formulation is contacted with the third solvent stream to form a mixture of the second formulation and third solvent stream, and the mixture of the first formulation, first and second solvent streams is contacted with the mixture of the second formulation and third solvent stream thereby causing formation of particles of the first and second substances, and the resultant mixture is subjected to a separation process thereby causing separation of the first and second substance from the first, second and third solvent streams.

Preferably, the first solvent stream comprises a $C_1$-$C_4$ hydrofluorocarbon solvent. Preferably, the $C_1$-$C_4$ hydrofluorocarbon does not include any chlorine atoms. More preferably, the $C_1$-$C_4$ hydrofluorocarbon solvent comprises one or more carbon, fluorine and hydrogen atoms only. Most preferably, the $C_1$-$C_4$ hydrofluorocarbon solvent is a $C_1$-$C_3$, especially a $C_1$-$C_2$ hydrofluorocarbon. An especially preferred $C_1$-$C_4$ hydrofluorocarbon solvent is a $C_2$ hydrofluorocarbon.

The $C_1$-$C_4$ hydrofluorocarbon may include up to 10, preferably up to 8, more preferably up to 6, especially up to 4, fluorine atoms. Preferably, the $C_1$-$C_4$ hydrofluorocarbon includes at least 2, more preferably at least 3, fluorine atoms.

Preferably, the $C_1$-$C_4$ hydrofluorocarbon solvent is aliphatic, preferably a saturated hydrofluoro aliphatic compound.

The $C_1$-$C_4$ hydrofluorocarbon may have a boiling point at atmospheric pressure of less than 20° C., preferably less than 10° C., more preferably less than 0° C., especially less than –10° C. The boiling point may be greater than –90° C., preferably greater than –70° C., more preferably greater than –50° C.

A preferred $C_1$-$C_4$ hydrofluorocarbon, which the first solvent stream may represent, is tetrafluoroethane, with 1,1,1,2-tetrafluoroethane (also known as HFC 134A) being especially preferred. HFC 134A boils at –26° C. at atmospheric pressure and has a vapour pressure at 20° C. of 5 BarG. It is chemically inert, being neither acidic nor alkaline, non-flammable, non-toxic and non-ozone depleting. HFC 134A has a very low viscosity (0.22 centipoise) and may, therefore, be pumped at high turbulence and sheer through very small orifices with modest applications of pressure. The gaseous solvent can easily be re-compressed back to a liquid and can be recovered virtually completely for re-cycling.

Another important advantage of the working pressure of the process of the present invention employing $C_1$-$C_4$ hydrofluorocarbon solvent streams is that engineering requirements are straightforward and easy to implement.

Although substantially pure HFC 134A may be used in some applications as the first solvent stream, since it is a very poor solvent, it may be mixed with small quantities of other co-solvents as described hereinafter to adjust the solvation properties.

Thus, the first solvent stream may include a co-solvent, which may also be, but is preferably not, a $C_1$-$C_4$ hydrofluorocarbon of the type described herein. The co-solvent is suitably selected to affect the boiling point and/or dissolution properties of the first solvent stream.

The co-solvent may be selected from $C_{2-6}$ hydrocarbons, which may be alicyclic or aliphatic. They are preferably alkanes or cycloalkanes such as ethane, n-propane, iso-propane, n-butane or iso-butane.

The co-solvent may also be a hydrocarbon ether, particularly a dialkylether, such as dimethyl ether, methyl ethyl ether or diethyl ether.

The co-solvent may also be a hydrocarbon with polar properties, such as those with dielectric constants of greater than 5. Suitable dielectric hydrocarbon co-solvents include alcohols, for example methyl, ethyl and isobutyl alcohols, and ketones, such as acetone.

Suitably, the first solvent stream comprises a major portion of said $C_1$-$C_4$ hydrofluorocarbon as described hereinbefore. Preferably, at least 90 wt %, more preferably at least 93 wt %, especially at least 97 wt % of the first solvent stream comprises a $C_1$-$C_4$ hydrofluorocarbon as described hereinbefore. The balance may be made up of one or more co-solvents as described above. Where the first solvent stream includes a co-solvent, it may comprise 1-50 wt %, preferably, 2-30 wt % and more preferably 2-20 wt % co-solvent as described herein.

Preferably, the co-solvent forms an azeotropic mixture with the first solvent stream so that its proportion in the first solvent stream may remain constant even though the first solvent stream may be redistilled many times.

Preferably, the second solvent stream has any feature of the first solvent stream as defined above. Preferably, the second solvent stream is the same as the first solvent stream.

When a third solvent stream is employed in the process of the present invention, preferably the third solvent stream has any feature of the first solvent stream as defined above. Preferably, the third solvent stream is the same as the first solvent stream. More preferably, the third solvent stream is the same as the first and second solvent streams.

Typically, hydrofluorocarbons have low boiling points and display a high affinity for organic solvents which renders them suitable for dissolution and extraction processes. We have found that hydrofluorocarbons typically have a high specific density and/or high surface tension which inhibits the ability of these compounds, such as 1,1,1,2 tetrafluoroethane, to be mixed with and dispersed with other fluids. If effective dispersion of the hydrofluorocarbon and an organic carrier of a formulation including a substance is not achieved then this may result in precipitation of comparatively large particles of the substance from the formulation and/or precipitation of the substance after the desired collection point e.g. a filter in the apparatus. Typically, in order to attain effective dispersion and/or mixing of the hydrofluorocarbon with the organic carrier, thus producing controlled precipitation of the substance, it is typically necessary to mix the hydrofluorocarbon and the formulation for a relatively long period of time. Consequently, the throughput of the process may be reduced substantially thereby reducing the commercial viability of the process.

Unexpectedly, we have found that by contacting a formulation including a substance with a first and second hydrofluorocarbon stream as defined above in a non-supercritical state promotes improved mixing and/or dispersion of the hydrofluorocarbon and the formulation including the substance. Consequently, the process of the present invention employing hydrofluorocarbon streams may be used to form relatively small particles of the substance at the desired collection point without the requirement of mixing the hydrofluorocarbon with the formulation for a relatively long time. Thus the throughput of the process compared to a comparable process including a single hydrofluorocarbon stream may be substantially increased thereby increasing the commercial viability of the process.

As stated previously, the solvent streams employed in the process of the present invention are in a non-supercritical state.

Suitably, the temperature of the first and second solvent streams (and third solvent stream when present) are each independently greater than or equal to −20° C., preferably greater than or equal to 0° C. Suitably, the temperature of the first and second solvent streams (and third solvent stream when present) are each independently less than or equal to 75° C., preferably less than or equal to 40° C.

Suitably, the first and second solvent streams (and third solvent stream when present) are at substantially the same temperature.

Suitably, the vapour pressure of the first and second solvent streams (and third solvent stream when present) are each independently greater than 1 bar G, preferably greater than or equal to 2 bar G, at the preferred temperatures mentioned above.

Suitably, the vapour pressure of the first and second solvent streams (and third solvent stream when present) are each independently less than or equal to 35 bar G, preferably less than or equal to 20 bar G, at the preferred temperatures mentioned above.

A preferred temperature range of the first and second solvent streams (and third when present) is 0 to 40° C., which typically produces a vapour pressure of 2 bar G to 20 bar G for the solvent streams. As stated previously a highly preferred first, second and third solvent stream is HFC 134A which has a critical temperature of greater than 100° C. and a critical pressure of greater than 40 bar G. Consequently, when the process of the present invention is operated within the preferred temperatures and pressures, particularly with regard to HFC 134A, it is evident that the solvent streams are in a non-supercritical state (e.g. they are not simultaneously above the critical temperature and critical pressure).

Suitably, during the operation of the process of the present invention, the vapour pressure of the first and second solvent streams (and third solvent stream when present) may each independently be increased by 1 to 5 bar G above the vapour pressure exhibited by the particular solvent at a given operating temperature. The increase in vapour pressure may be achieved by a compressor. Surprisingly, we have found that if the operating pressure of the first and second solvent streams (and third solvent stream when present) are each independently 1 to 5 bar G above the vapour pressure at that given temperature, then this may increase the rate of mixing and interdispersion of the solvent streams with the formulation stream.

Preferably, the first formulation comprising the first substance is a solution. The solution may be a true solution or a colloidal solution. The colloidal solution may be a sol, emulsion, gel or other colloidal matrix.

The first formulation suitably includes an organic solvent as the formulation carrier solvent. Preferably, the first substance is soluble in the organic solvent.

Suitable organic solvents of the formulation include alcohols, especially aliphatic alcohols such as methanol, ethanol, 1-propanol or 2-propanol; ketones, especially aliphatic ketones, with dialkyl ketones such as acetone or methyl isobutyl ketone being preferred; organic acids, preferably acetic acid; amides, such as N,N'-dialkylamide or alkylamide; carboxylic acid derivatives, for example, anhydrides such as acetic anhydride; cyanide derivatives, for example, hydrogen cyanide or any alkyl cyanide; ammonia; sulphur containing molecules; acetates, with methyl acetate, ethyl acetate and butyl acetate being preferred; ethers, with dimethyl ether and diethyl ether being preferred; alkanes or alkane derivatives, with dichloromethane and dichloroethane being preferred; tetrahydrofuran; toluene; hexane; heptane and petroleum ether mixtures.

The organic solvent of the first formulation may comprise a combination of two or more of the above, in any ratio. Preferably, the organic solvent is miscible with the first, second and third solvent streams as defined above.

Typically, the process of the present invention permits substantially instantaneous mixing and/or interdispersion of the organic solvent with the first, second and third solvent streams.

Suitably, the first substance of the first formulation is insoluble or sparingly soluble in the first, second and/or third solvent streams as defined hereinbefore.

Preferably, the solubility of the first substance in the first, second and/or third solvent streams as defined hereinbefore is less than 20% weight by weight (w/w), more preferably less than 10% w/w, especially less than 5% w/w, most especially less than 2% w/w.

Preferably, the solubility of the first substance in the first, second or third solvent streams as defined hereinbefore is only up to 1% w/w, more preferably only up to 0.5% w/w, especially only up to 0.3% w/w, most especially only up to 0.1% w/w.

Suitably, if the first substance is soluble in the organic solvent of the first formulation and insoluble or only sparingly soluble in the first and/or the second and/or the third solvent stream, then this permits the formation of small particles of the first substance.

Suitably, the first substance is an active ingredient selected from flavours, fragrances, plastics, pigments, dyes and biologically active compounds such as pharmaceuticals, synthetics and semi-synthetic drugs and pesticides.

Preferably, the second formulation including the second substance has any feature of the first formulation as defined above. Preferably, the second substance is soluble in the organic solvent. Suitably, the organic solvent of the second formulation is the same as the organic solvent of the first formulation.

Preferably, where a second formulation is included in the process of the present invention, the second substance of the second formulation may have any feature of the first substance of the first formulation as defined above.

Suitably, the second substance of the second formulation is the same as the first substance of the first formulation.

In a highly preferred embodiment of the present invention where a second formulation is employed, the second substance of the second formulation is not the same as the first substance of the first formulation, so that particles of the first substance and particles of a second different substance are formed.

Suitably, this embodiment of the present invention may permit the formation of a multi-component particulate formulation in a single step. Suitably, the multi-component particulate formulation may comprise a homogeneous mixture of the first and second particulate substances. Moreover, the size and crystal shape of the first and/or second particulate substances may be controlled during formation of the multi-component particulate formulation.

Preferably, where the first substance of the first formulation is not the same as the second substance of the second formulation, the first substance comprises a biologically active compound as defined above and the second substances comprises either a different biologically active compound as defined above or an additive selected from any one of the combination of: stabilisers; dispersion agents; surfactants; taste enhancing or masking additives; antioxidants; hygroscopic prevention agents; and, any other pharmaceutically or veterinary acceptable additive or excipients. Consequently, pharmaceutical formulations including two different pharmaceutical active agents in particulate form may be prepared by this embodiment of the present invention. Moreover, particulate pharmaceutical formulations including a particulate pharmaceutical active agent and a particulate additive as defined above may also be prepared by this embodiment of the present invention.

Alternatively, where a second formulation is not employed in the process of the present invention, a second substance as defined hereinbefore may be incorporated in the first formulation.

Consequently, pharmaceutical formulations including two different particulate pharmaceutical active agents or a particulate pharmaceutical active agent and a particulate pharmaceutical additive as defined above may be prepared by including a second pharmaceutical active agent or additive, respectively, in the first formulation.

According to an especially preferred embodiment of the present invention a surfactant is included in the first formulation, and/or first solvent stream and/or second solvent stream, and/or third solvent stream and/or second formulation stream where present. Preferably, the surfactant is included in the first and/or second formulation where present.

The inclusion of a surfactant in the process of the present invention as outlined above, further promotes mixing and dispersion of the solvent streams with the formulation. Consequently, the inclusion of a surfactant in the process of the present invention may permit formation of even smaller particles at the desired collection point with less mixing time, compared with the process of the present invention not including a surfactant. This further increases the throughput and commercial viability of the process of the present invention.

Moreover, we have discovered that the inclusion of a surfactant in a formulation and/or a single solvent stream in a process for producing particles using a single solvent stream in a non-supercritical state may also permit the formation of smaller particles at the desired collection point with less mixing time, compared with a comparable process not including a surfactant.

Thus according to a further aspect, the present invention provides a process for preparing particles of a substance comprising contacting a first formulation including a first substance as defined hereinbefore with a first solvent stream as defined hereinbefore, thereby causing formation of particles of the first substance, wherein the first solvent stream is in a non-supercritical state and the first solvent stream and/or the first formulation includes a surfactant, and subjecting the resultant mixture to a separation process thereby causing separation of the first substance from the first solvent stream.

Suitably, the surfactant is selected from a non-ionic, anionic, cationic, or amphoteric surfactant or a mixture of two or more of those surfactants. Such surfactants are well known and readily available to those skilled in the art.

Contact between the first formulation, the first and second solvent streams, and the second formulation and third solvent stream where present, may be achieved in a stirred chamber, or preferably in an active mechanical or static mixer. Preferably, a stream of the first formulation and a stream of the second formulation where present is contacted with the first and second solvent streams, and the third solvent stream if present. A suitable inline mixer comprises two or more concentric tube arrangements.

For example, where two concentric tubes are used in the process of the present invention, a first formulation stream may be fed through one tube and the first solvent stream may be fed through the other. Suitably, the first formulation stream is fed through the inner tube and the first solvent stream is fed through the outer tube. The outlets of the inner and outer tubes may be designed to effect contact between the first formulation and the first solvent stream. The second solvent stream may be fed by an alternative pathway to contact the formulation and the first solvent stream. The contact between the first formulation, first and second solvent streams may take place simultaneously. Alternatively, the first formulation stream may be contacted initially with the first solvent stream and the resultant mixture of the first formulation and the first solvent stream contacted with the second solvent stream.

Where the process of the present invention comprises contacting a first formulation with a first solvent stream only, wherein the first formulation and/or first solvent stream includes a surfactant, then two concentric tubes as described above may be used to mix the first formulation stream with the first solvent stream.

Where the mixture of the first formulation, the first solvent stream and the second solvent stream, is contacted with a second formulation, then a first formulation stream may be fed through the inner tube of two concentric tubes and a mixture of a second formulation stream and the first solvent stream fed through the outer tube. The outlets of the inner and outer tubes may be designed to effect contact between the first formulation, the second formulation and the first solvent streams. The second solvent stream may be fed via an alternative pathway to contact the mixture of the first formulation, the second formulation and the first solvent streams. The contact between the first formulation, the second formulation, the first and second solvent streams may take place simultaneously. Alternatively, the first formulation stream may be contacted initially with the mixture of the second formulation and first solvent stream, and the resultant mixture contacted with the second solvent stream.

Where three concentric tubes are used in the process of the present invention, the first formulation stream may be fed through one tube, the first solvent stream fed through another tube and the second solvent stream fed through the third tube. Suitably, the first formulation stream is fed through the inner tube, the first solvent stream is fed through the middle tube, and the second solvent stream is fed through the outer tube. The outlet end of the inline mixer may be designed to effect contact between the first formulation stream and the first and second solvent streams. The contact between the first formulation, first and second solvent streams may take place simultaneously. Alternatively, the first formulation stream may be contacted initially with the first solvent stream and the resultant mixture of the first formulation and the first solvent contacted with the second solvent stream.

Alternatively, two sets of two concentric tubes may be used in the process of the present invention. In the first set of tubes, the first formulation stream may be fed through one tube and the first solvent stream fed through the other. Suitably, the first formulation stream is fed through the inner tube and the first solvent stream is fed through the outer tube. In the second set of tubes, the second formulation stream may be fed through one tube and the second solvent stream fed through the other. Suitably, the second formulation stream is fed through the inner tube and the second solvent stream is fed through the outer tube. Suitably, the outlet ends of the first and second sets of concentric tubes may be designed to effect the simultaneous mixing of the first formulation stream, the second formulation stream, the first solvent stream and second solvent stream. Alternatively, the outlet ends of the first set of concentric tubes may be designed to effect the initial mixing of the first formulation stream with the first solvent stream and the outlet ends of the second set of concentric tubes may be designed to effect the initial mixing of the second formulation with the second solvent stream, followed by the mixing of the first formulation and first solvent mixture with the second formulation stream and second solvent mixture.

It will be appreciated by those skilled in the art that up to five concentric tubes may be employed when the process of the present invention involves the contacting of a first formulation stream with a second formulation stream, a first, second and third solvent streams. If five concentric tubes are employed then a separate tube may be used for the first formulation stream, the second formulation stream, and the first, second and third solvent streams.

An alternative suitable inline mixer comprises an arrangement of separate tubes. For example, a tube for the first formulation stream, a separate tube for the first solvent stream and a third separate tube for the second solvent stream. The outlet ends of the separate tubes may be designed to effect contact between the first formulation, the first and the second solvent streams in a manner as defined herein e.g. simultaneous mixing of all components or stepwise mixing of the components. It will be appreciated that further separate tubes may be used for a second formulation and/or third solvent stream if required.

It will be appreciated by those skilled in the art, that when an in-line mixer comprises two or more tube arrangements as defined hereinbefore, then the diameter of the tubes may be varied to provide optimum linear flow kinetics to promote efficient and rapid mixing. As the linear flow is indirectly proportional to the cross-sectional area of the tube, the linear flow may be varied by varying the cross-sectional area of the tube and adapted to, amongst other things, the scale of the operation.

Typically, for laboratory semi-scale and pilot plant operations the tube(s) for delivering a formulation stream(s) has an inner diameter in the range of 50 µm to 750 µm, and the tubes for delivering the solvent streams have an inner diameter in the range of 250 µm to 4 mm.

Suitably, the inline mixer as defined hereinbefore may be designed so the first formulation stream, the first solvent stream and the second solvent stream, and optionally the second formulation and third solvent stream when present, contact each other at various angles.

In a preferred embodiment, the first formulation stream flows in an opposite direction to the first solvent stream, and the second solvent stream flows at an angle to the first formulation stream. Preferably, the second solvent stream flows substantially perpendicular to the first formulation stream, more preferably substantially perpendicular to both the first formulation stream and the first solvent stream.

In a further preferred embodiment, the first solvent stream and the second solvent stream both flow at an angle to the first formulation stream. Preferably, the first solvent stream flows substantially perpendicular to the first formulation stream. Preferably, the second solvent stream flows substantially perpendicular to the first formulation stream. Preferably, the first solvent stream flows in an opposite direction to the second solvent stream. More preferably, the first and second solvent streams contact each other in a head to head relationship.

In a further preferred embodiment, the first formulation stream flows in an opposite direction to both the first and second solvent streams. Preferably, the first formulation stream contacts the first solvent stream in a head to head relationship to form a mixture of the first formulation and the first solvent, then this mixture contacts the second solvent stream in a head to head relationship to form the resultant mixture which is subjected to the separation.

Suitably, the choice of the mode of contact between the first formulation stream, the first solvent stream and the second solvent stream, and optionally the second formulation and third solvent stream when present, as defined hereinbefore may depend on various factors such as the concentration of the first and second formulations, the scale of the operation and the first and second substances per se.

Typically, the flow rates and flow ratios of the first formulation stream, the first and second solvent streams, and the third solvent stream and second formulation stream if present, are easily controllable variable parameters of the process of the present invention.

For example, it is possible to adjust the flow ratios of the first formulation stream and the first solvent stream so that only the physical properties of the first formulation stream are modified thereby inducing the desired instantaneous dispersion with the second solvent stream. Alternatively, the flow of the first formulation stream and first solvent stream may be adjusted to effect partial precipitation of the first substance from the first formulation stream prior to contact with the second solvent stream. It will be appreciated by those skilled in the art that the linear velocity of the first formulation stream, the second formulation stream, the first and second solvent streams may be governed by the inner diameter or cross-sectional area of each flow inlet at the point of entry into the respective mixing zone of the in-line mixer. The cross-sectional area of each flow inlet may be adjusted by techniques well known to those skilled in the art in order to provide the desired flow ratios.

The separation process includes passing the resultant mixture through a filter, so that the particles of the substance (and second substance if present) collect on the filter and the mother liquors comprising the first and second solvent streams and the carrier solvent of the first formulation stream (and the carrier solvent of the second formulation stream if present) pass through the filter.

Preferably, the filter is located between a first region at pressure $P_1$ and a second region at pressure $P_2$, wherein $P_1$ is greater than $P_2$, and the separation process includes passing the resultant mixture from the first region to the second region. Preferably, the resultant mixture is passed from the first region through the filter and sprayed into the second region, so that a mist of fine droplets of the mother liquors form in the second region.

Preferably, the second region comprises a chamber at pressure $P_2$.

Suitably, passing the mother liquors into a second region of reduced pressure compared to the first region, causes evaporation and separation of the first and second solvents from the carrier solvent of the first formulation (and second formulation if present). Evaporation of the first and second solvents may be aided by supplying heat, equivalent to the latent heat of vaporisation, to the second region.

The vaporised first and second solvents (and third solvent if present) are preferably removed from the second region via a first outlet. If the second region comprises a chamber, the first outlet is suitably situated towards the top of the chamber.

The carrier solvent of the first formulation (and second formulation if present), such as an organic solvent, may be removed from the second region by means of a different outlet from the first and second solvents.

Washing of the separated substance(s) with further supplies of first and/or second solvents and subsequent drying may provide the substance as a powder of crystals having a very narrow range of particle sizes and a specific morphologically discrete structure, form and shape.

The process described may have widespread applications for the preparation of particles of many different substances. Preferably, the substance is an active ingredient selected from flavours, fragrances, plastics, pigments, dyes and biologically active compounds such as pharmaceuticals, synthetic and semi-synthetic drugs and pesticides.

The method also facilitates the simple, efficient and complete removal for recovery and recycling for re-use of all of the solvent streams and/or co-solvent(s) from both the crystalline product and the washings thereof. Furthermore, all the organic solvent of the formulation that may originally be used to dissolve the substance may be recovered from the original supernatant or filtrate and washings from which the crystals are harvested, for subsequent re-use. The separation of the substance may take place in a single step or in multiple steps of separation. The technique of varying physical parameters such as temperature, sheer, amount of first solvent, relative concentration of substance(s) in the formulation, the relative compositions of the solvent mixture and ratio of second solvent to first solvent may optionally be used in any or all of these steps.

Particles having a size of less than or equal to 200 microns, preferably less than or equal to 100 microns, more preferably less than or equal to 50 microns, more preferably less than or equal to 20 microns, most preferably less than or equal to 10 microns may be produced in accordance with the present invention.

Particles having a size of greater than or equal to 0.5 microns, more preferably greater than or equal to 1 micron may be produced by the present invention.

Most preferably, the process of the present invention may produce particles having a specified range of particle sizes and crystalline form by design. Suitably, the process of the present invention may produce particles having a defined crystalline form having a size in the range of 1 to 3 microns, 5 to 10 microns, 10 to 20 microns and 20 to 50 microns.

For the avoidance of doubt, the aforementioned particle sizes represent a maximum dimension of the particles.

Particle size, form and uniformity may be controlled by the following variable parameters:

- The concentration of substance in the formulation.
- Type of carrier solvent used in the formulation.
- The composition of the first, second and third (if present) solvents.
- The volumetric flow rates of all streams used in the process.
- The co-solvent types and ratios used in the first, second and third (if present) solvents.
- The ratios of the formulation of the first, second and third (if present) solvents.
- The diameter of each flow inlet into the nozzle device.
- The volumetric flow/inlet cross-sectional area of each stream inlet.
- Pressure and pressure differentials across the mixing zones of the nozzle.
- Temperature and temperature differentials across the mixing zones.

The design of the nozzle device in terms of orientation of each flow stream and shape and size of each mixing zone.

Advantageously, the present invention allows for production of particles having a controlled crystal habit. The present invention also provides a method of producing small particles.

According to a further aspect, the present invention provides apparatus for preparing particles of a substance comprising a mixer as described hereinbefore having a first inlet connected to a first solvent source comprising a first solvent as defined hereinbefore, a second inlet connected to a second solvent source comprising a second solvent as defined hereinbefore, a third inlet connected to a first formulation including a first substance as defined hereinbefore, and an outlet connectable to a separation means for separating particles of the first substance from the first and second solvents. Preferably, the apparatus further includes a fourth inlet connected to a second formulation including a second substance as defined hereinbefore.

The present invention will now be illustrated, by way of example only, with reference to the following drawings, in which:—

Figure 1:
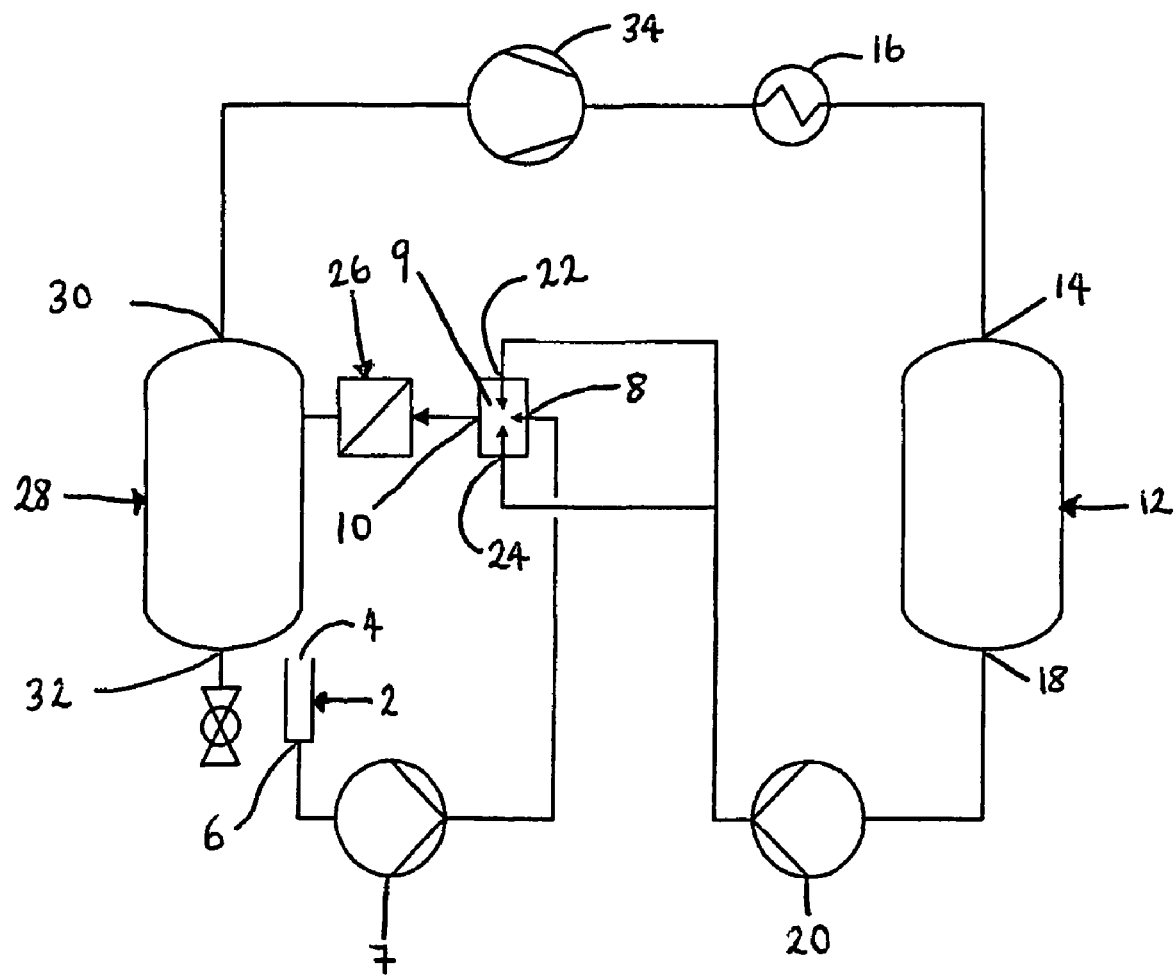
FIG. 1 is a schematic illustration of apparatus suitable for carrying out the process of the present invention.

FIG. 1 shows a first vessel 2 for containing a formulation having an inlet 4 at its upper end and an outlet 6 at its lower end. Vessel 2 may also be equipped with a motor driven stirrer (not shown), or other suitable agitation means, and a filtration grid (not shown) placed over the outlet 6.

The outlet 6 of the first vessel 2 is connected to a formulation pump 7 which in turn is connected to an inlet 8 of an in-line mixer 9.

A second vessel 12 for containing the hydrofluorocarbon solvent (HFC) is connected via an inlet 14 at is upper end to a condenser 16 and connected via an outlet 18 at its lower end to a pump 20. The pump 20 is connected to the in-line mixer 9 at two separate points 22,24 to permit introduction of two separate hydrofluorocarbon streams into the in-line mixer.

The outlet of the in-line mixer 10 is connected via a filter 26 to an evaporation vessel 28 having an outlet 30 at its upper end and a drain 32 at its lower end. The drain 32 permits drainage or recovery of the organic solvent removed from the formulation. The outlet 30 of the evaporation vessel 28 is connected to a compressor 34 which is connected to the second vessel 12 via the condenser 16.

The whole apparatus is connected via a network of pipes, pressure and temperature gauges, flow and pressure control valves to permit selection and maintenance of optimum critical parameters of flow, temperature and pressure in each part of the apparatus.

In operation of the apparatus of FIG. 1, hydrofluorocarbon is metered into the second vessel 12, then it is fed from the second vessel 12 to the in-line mixer 9 via a pump 20. In this regard, two separate streams of the liquefied hydrofluorocarbon are pumped to the in-line mixer 9 at entry points 22 and 24. These hydrofluorocarbon streams pass through the in-line filter 26 into the evaporation vessel 28. As a result of the reduced pressure in the evaporation vessel 28 the hydrofluorocarbon evaporates and passes through the outlet 30 of the evaporation vessel 28, whereby it is recycled continuously by evaporation with the aid of a compressor 34 and condenser 16. The recondensed hydrofluorocarbon is returned back into the second vessel 12.

Optionally, a separate pump (not shown in FIG. 1) may be used to supply liquefied hydrofluorocarbon to each entry point 22 and 24 of the in-line mixer 9 independently. The use of two separate pumps may allow more precise flow control of the two liquefied hydrofluorocarbon streams.

A formulation comprising a substance to be prepared as small particles in solution with an organic solvent is metered into the first vessel 2. The formulation is fed to the in-line mixer 9 via pump 7. The HFC streams and the formulation are contacted in the in-line mixer 9 in two distinct stages in series. Firstly, the HFC stream flowing through entry point 22 of the in-line mixer 9 contacts the formulation stream, to form a combined stream of the formulation and HFC. The combined stream of the formulation and HFC is contacted almost immediately with the second HFC stream flowing through entry point 24 of the in-line mixer 9. The high affinity of the HFC to the organic solvent of the formulation results in mass transfer of the organic solvent into the HFC. The mass transfer is increased significantly by contact of the second HFC stream with the combined stream of the formulation and HFC, as the second HFC stream mixes and inter-disperses extremely efficiently with the combined stream. This causes the substance to precipitate as small particles.

The flow of the resultant suspension comprising particles of the substance is passed through the in-line filter. The particles collect on the filter 26 and the resulting mother liquors comprising the organic solvent and HFC's, now depleted of solid particles, pass into vessel 28 where the HFC is evaporated and recycled as described above leaving the organic solvent in the evaporation vessel 28 for disposal or recovery at a later stage.

At the end of the run, the HFC recycling can be maintained for a predetermined time to effect washing of the collected solid by removing any trace contamination of the carrier organic solvent from the formulation.

Optionally, heat can be supplied to the evaporation vessel 28 by conduction via the walls of the vessel 28 or by introduction of microwave energy into the chamber of vessel 28. All of the vessels may be jacketed to provide a means of temperature control.

Figure 2:
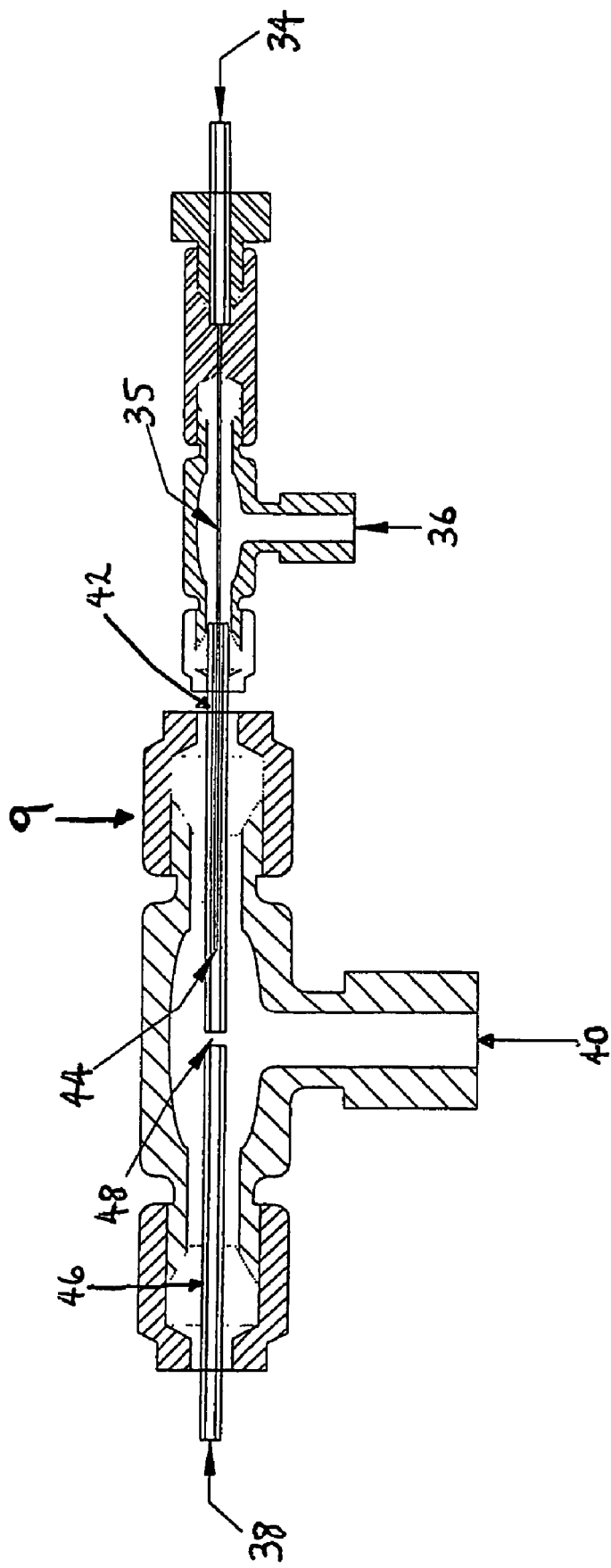
FIG. 2 is a longitudinal cross-sectional view of a preferred in-line mixer.
Figure 3:
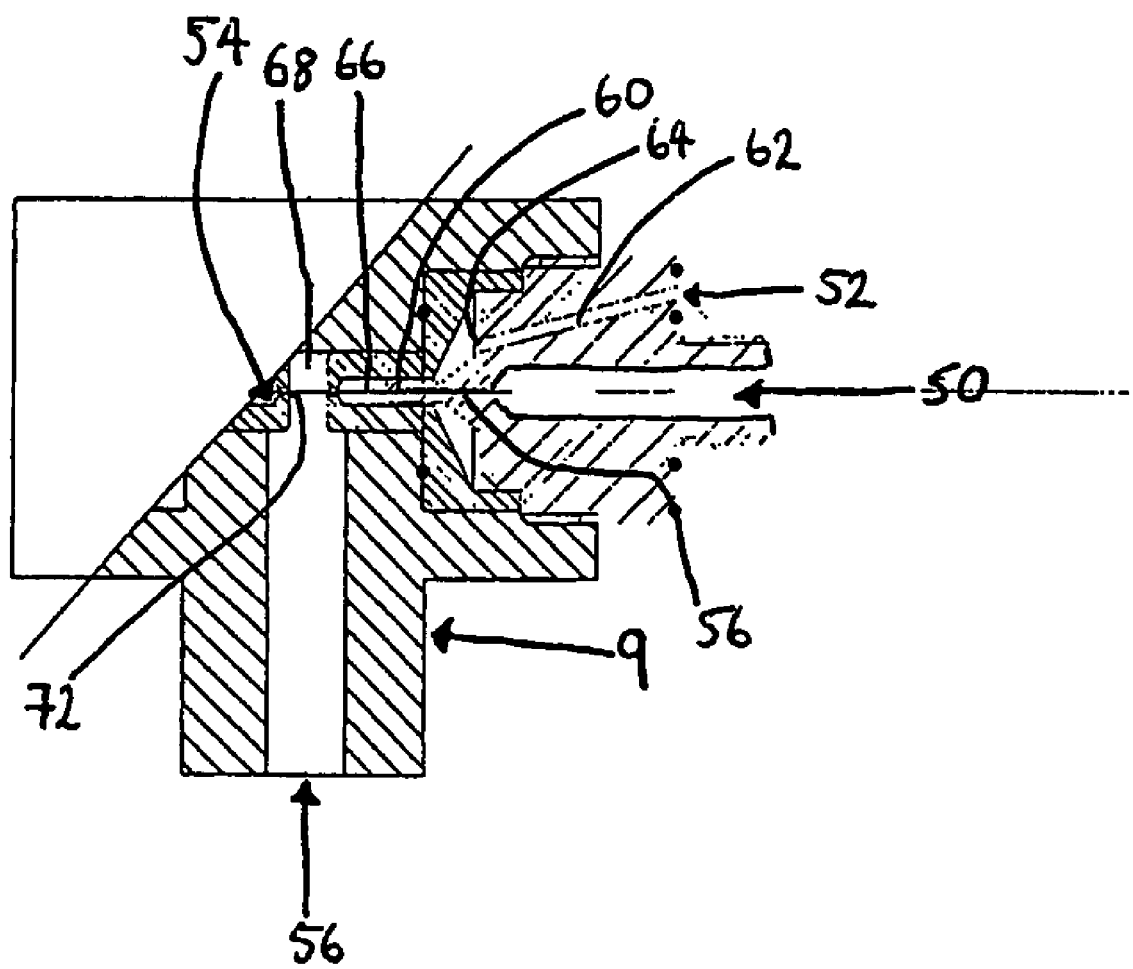
FIG. 3 is a longitudinal cross-sectional view of an alternative preferred in-line mixer.
Figure 4:
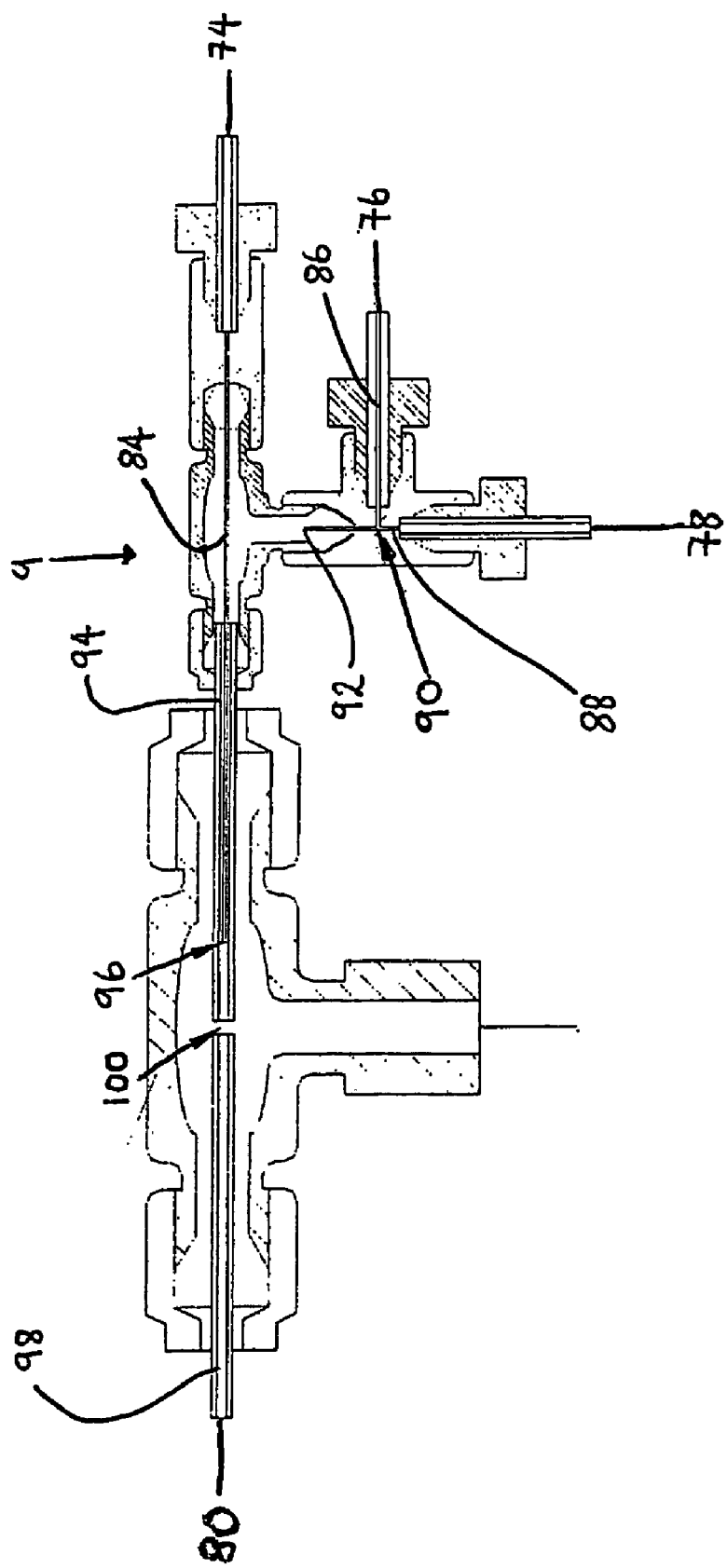
FIG. 4 is a longitudinal cross-sectional view of an alternative preferred in-line mixer.
Figure 5:
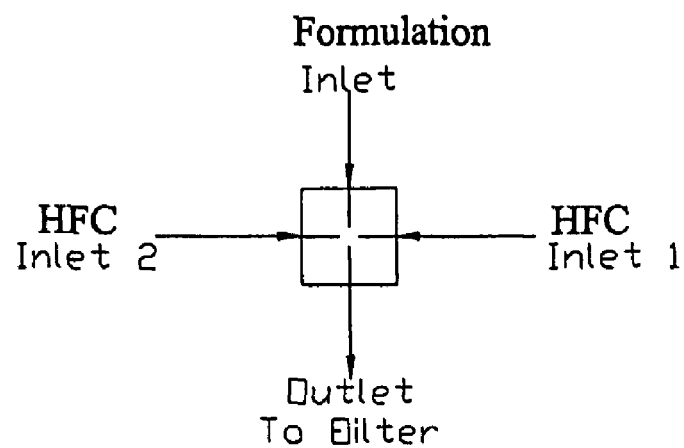
FIGS. 5 to 8 are schematic illustrations of preferred mixing arrangements of the formulation, the first hydrofluorocarbon solvent and the second hydrofluorocarbon solvent.

There is shown in FIG. 2 a preferred in-line mixer 9 having three flow inlets 34,36,38 and an outlet 40 for connection to an evaporation vessel via a filter. Inlet 34 forms a capillary tube 35 for introduction of the formulation comprising the substance to be prepared as small particles in solution with an organic solvent. Inlet 36 for introduction of a stream of HFC forms an outer tube 42 around the capillary tube 35 of the inlet 34, thereby forming two concentric tubes. The outer tube 42 extends beyond the end of the inner capillary tube 35 to define a first mixing zone 44. Inlet 38 for introduction of a second stream of HFC forms a tube 46 that extends towards the end of the outer tube 42 of inlet 36, thereby defining a second mixing zone 48.

In operation the formulation comprising the substance to be prepared as small particles in solution with an organic solvent is pumped through inlet 34. A first stream of HFC is pumped through inlet 36 and a second stream of HFC is pumped through inlet 38. The first stream of HFC contacts the formulation at the first mixing zone 44 to form a mixture of the formulation and HFC. The HFC dilutes and modifies the physical properties of the formulation stream so that the combined stream has similar specific density and surface properties to the HFC. The mixture of the formulation and HFC contacts the second stream of HFC at the second mixing zone 48. The second stream of HFC mixes extremely quickly and efficiently with the mixture of the formulation and first HFC stream to effect almost immediate precipitation of the solid particles of the substance which pass through outlet 40.

Flow rates, linear flow speeds and ratio of flows of the formulation and HFC streams may be controlled to produce the optimum process conditions for a particular formulation.

There is shown in FIG. 3 an alternative preferred in-line mixer 9 having three flow inlets 50,52,54 and an outlet 56 for connection to an evaporation vessel via a filter. The mode of operation of the in-line mixer of FIG. 3 is similar to that of the in-line mixer exemplified in FIG. 2. Inlet 50 for the introduction of the formulation defines an inner bore 56 having an outlet 58 in the form of a nozzle 60. Inlet 52 for introduction of a stream of HFC defines an outer bore 62 having an outlet 64 in an enclosed headspace 66 in the region of nozzle 60. The enclosed headspace 66 defines a first mixing zone for the formulation and HFC. The first mixing zone has an outlet into a second enclosed headspace 68 defining a second mixing zone. Inlet 54 for introduction of a separate stream of HFC defines a tubular passage 70 having an outlet 72 in the region of the second mixing zone to permit contact of the second HFC stream with the mixture of the formulation and first HFC stream.

There is shown in FIG. 4 an alternative preferred in-line mixer 9 suitable for contacting a first formulation with a second formulation, a first HFC stream and a second HFC stream. The mode of operation of the in-line mixer of FIG. 4 is similar to that of the in-line mixer exemplified in FIG. 2. The in-line mixer has four flow inlets 74,76,78,80 and an outlet 82 for connection to an evaporation vessel via a filter. Inlet 74 forms a capillary tube 84 for introduction of a first formulation comprising a first substance in solution with an organic solvent. Inlet 76 forms a capillary tube 86 for introduction of a second formulation comprising a second substance in solution with an organic solvent. Inlet 78 forms a capillary tube 88 for introduction of a stream of HFC. Capillary tube 86 is in fluid communication with capillary tube 88 thereby defining a first mixing zone 90. The outlet 92 of the first mixing zone 90 forms an outer tube 94 around the capillary tube 84 of the inlet 74, thereby forming two concentric tubes. The outer tube 94 extends beyond the end of the inner capillary tube 84 to define a second mixing zone 96. Inlet 80 for introduction of a second stream of HFC forms a tube 98 that extends towards the end of the outer tube 94, thereby defining a third mixing zone 100.

In operation, the first formulation comprising the first substance to be prepared as small particles in solution with an organic solvent is pumped through inlet 74. A second formulation comprising the second substance to be prepared as small particles in solution with an organic solvent is pumped through inlet 76. A first stream of HFC is pumped through inlet 78 and a second stream of HFC is pumped through inlet 80. The first stream of HFC contacts the second formulation at the first mixing zone 90 to form a mixture of the second formulation and the first HFC. The mixture of the second formulation and first HFC contacts the first formulation at the second mixing zone 96 to form a mixture of the first formulation, the second formulation and first HFC. The HFC dilutes and modifies the physical properties of the first and second formulation streams so that the formulation streams have similar specific densities and surface properties to the HFC. The mixture of the first formulation, second formulation and first HFC contacts the second stream of HFC at the third mixing zone 100. The second stream of HFC mixes extremely quickly and efficiently with the mixture of the first formulation, second formulation and first HFC stream to effect almost immediate precipitation and formation of a homogeneous mixture of solid particles of the first and second substances which pass through outlet 82.

There are shown in FIGS. 5 to 8 schematic illustrations of preferred mixing arrangements of the formulation, the first HFC stream and the second HFC stream with an in-line mixer.

In FIG. 5, a formulation stream is contacted simultaneously at 90° by two opposing flows of the first and second HFC streams.

In FIG. 6, a formulation stream is initially contacted with a first HFC stream flowing at 90° to the formulation stream. The resultant mixture of the formulation and the first HFC is contacted head on by a second HFC stream flowing in an opposite direction.

In FIG. 7, the formulation stream is initially contacted with a first HFC stream flowing at 90° to the formulation stream to form a mixture of the formulation and first HFC. A separate formulation stream is contacted with a second HFC stream flowing at 90° to the formulation stream to form a mixture of the formulation and the second HFC. The mixture of the formulation and first HFC is then contacted head on by the mixture of the formulation and the second HFC flowing in an opposite direction.

In FIG. 8, a formulation stream is contacted simultaneously by a first HFC stream flowing at 90° to the formulation stream and a second HFC stream flowing in an opposite direction to the formulation stream. The resultant mixture is then contacted by a third HFC stream flowing in an opposite direction to the resultant mixture and by a separate formulation stream flowing at 90° to the third HFC stream.

Figure 9:
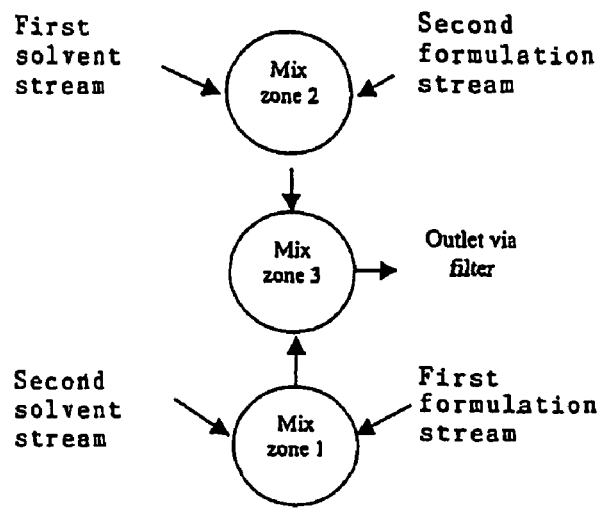
FIGS. 9 to 11 are schematic illustrations of preferred mixing arrangements of a first formulation with a second formulation, a first hydrofluorocarbon solvent and a second hydrofluorocarbon solvent.
Figure 10:
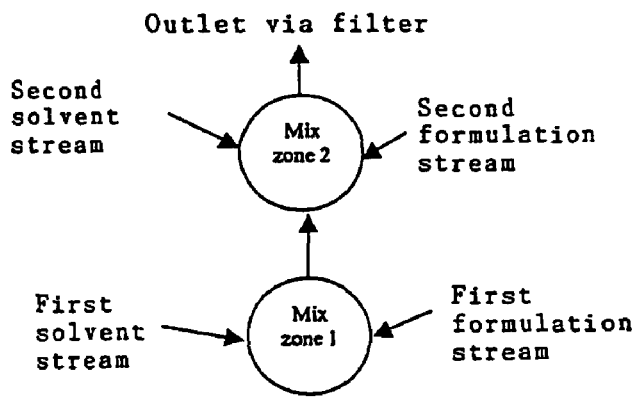
Figure 11:
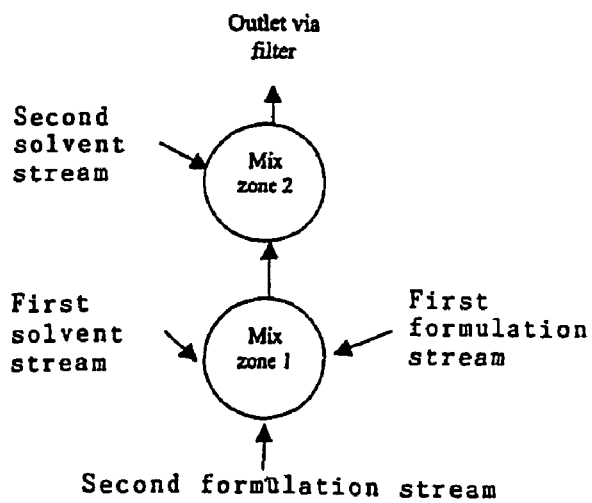

There are shown in FIGS. 9 to 11 schematic illustrations of preferred mixing arrangements of a first formulation comprising a first substance, a second formulation comprising a second substance, a first HFC stream and a second HFC stream with an in-line mixer.

In FIG. 9, a first formulation is contacted with a first HFC stream to form a mixture of the first formulation and first HFC stream. A second formulation is contacted with a second HFC stream to form a mixture of the second formulation and second HFC stream. The mixture of the first formulation and first HFC stream is contacted with the mixture of the second formulation and second HFC stream to form a resultant mixture which is subjected to a separation process to form particles of the first and second substance.

In FIG. 10, a first formulation is contacted with a first HFC stream to form a mixture of the first formulation and first HFC stream. The mixture of the first formulation and first HFC stream is contacted simultaneously by a second formulation and second HFC stream to form a resultant mixture which is subjected to a separation process to form particles of the first and second substance.

In FIG. 11, a first formulation is contacted with a second formulation and a first HFC stream to form a mixture of the first formulation, the second formulation and first HFC stream which is then contacted with a second HFC stream to form a resultant mixture which is subjected to a separation process to form particles of the first and second substance.

The following examples demonstrate that contacting a formulation in two distinct stages in accordance with the process of the present invention with a first and second solvent, both of which are in a non-supercritical state, produces particles of smaller size and in higher yields compared with contacting a formulation with a single solvent that is in a non-supercritical state. Moreover, the inclusion of a surfactant in the process of the present invention may produce particles of a smaller size and in higher yields compared with a comparable process not including a surfactant.

All examples were performed using the apparatus of FIG. 1, except in the comparative examples the dual stage mixer is replaced with a single-stage mixer to permit mixing of a formulation stream with a single solvent stream.

EXAMPLE 1

(a) Comparative Example of Single-Stage Mixing

A 10 ml solution containing 10% w/v of adipic acid (hexanedioic acid) dissolved in ethanol was charged to the formulation storage vessel. HFC 134A was pumped at a flow rate of 36 ml/minute from the storage vessel, via the mixing nozzle and in-line filter with a 0.5µ cut off, into the evaporation vessel from which it was recycled back, using the gas compressor and condenser, for continuous re-use. The adipic acid solution was pumped at a flow rate of 0.5 ml/minute through the nozzle where it was subjected to mixing with a single stream of HFC 134A causing the precipitation of the adipic acid. The resulting slurry was directed into the evaporation vessel via the in-line filter. The HFC 134A was continuously recycled as described previously. The experiment was continued until the 10 ml of adipic solution was used up. All the HFC 134A was returned to the storage vessel, the methanol was removed from the evaporation vessel and the solid particles of adipic acid were removed from the in-line filter and examined under a microscope.

Less than 0.2 g of adipic acid as a white crystalline solid with a slightly fluffy appearance were isolated from the in-line filter. The crystalline solid had a particle size range of 20-100 microns observed under a microscope.

(b) Two-Stage Mixing in Accordance with the Present Invention

Figure 6:
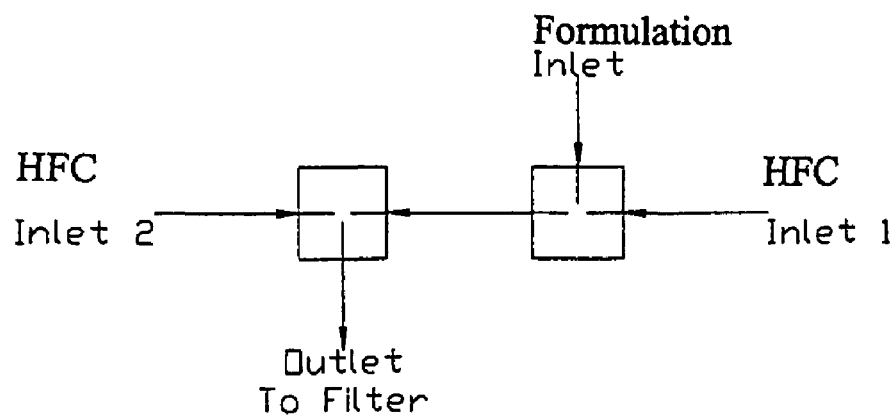
Figure 7:
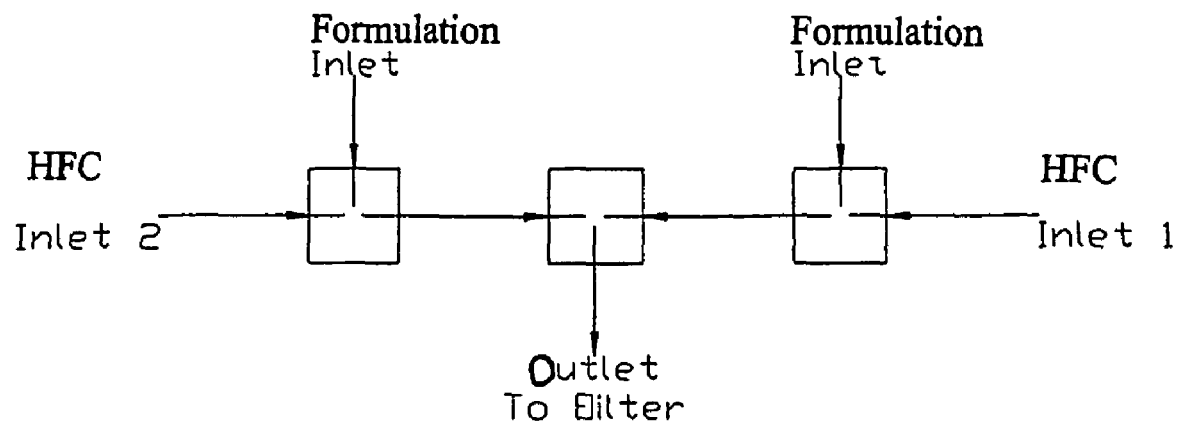
Figure 8:
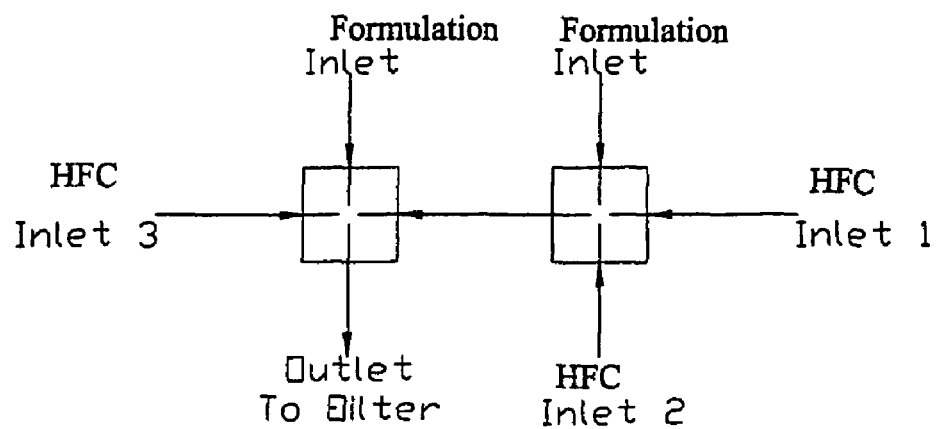

The nozzle device in this experiment was configured as illustrated in FIG. 6. HFC 134A flow was split into two streams each entering a different mixing zone of the nozzle at a flow rate of 18 ml/minute. Adipic acid solution (10% w/v of adipic acid in 10 ml of ethanol) was pumped into a first mixing zone at a flow rate of 0.5 ml/minute where it was mixed with the first HFC 134A stream. Almost immediately, the combined stream entered the second mixing zone where it was brought into contact with the second HFC 134A stream causing rapid inter-dispersion of the two phases into one another and causing precipitation of the adipic acid as crystalline solid particles. The resulting slurry was directed into the evaporation vessel via the in-line filter. The HFC 134A was continuously recycled as described previously. The experiment was continued until the 10 ml of adipic solution was used up. All the HFC 134A was returned to the storage vessel, the methanol was removed from the evaporation vessel and the solid particles of adipic acid were removed from the in-line filter and examined under a microscope.

Figure 12:
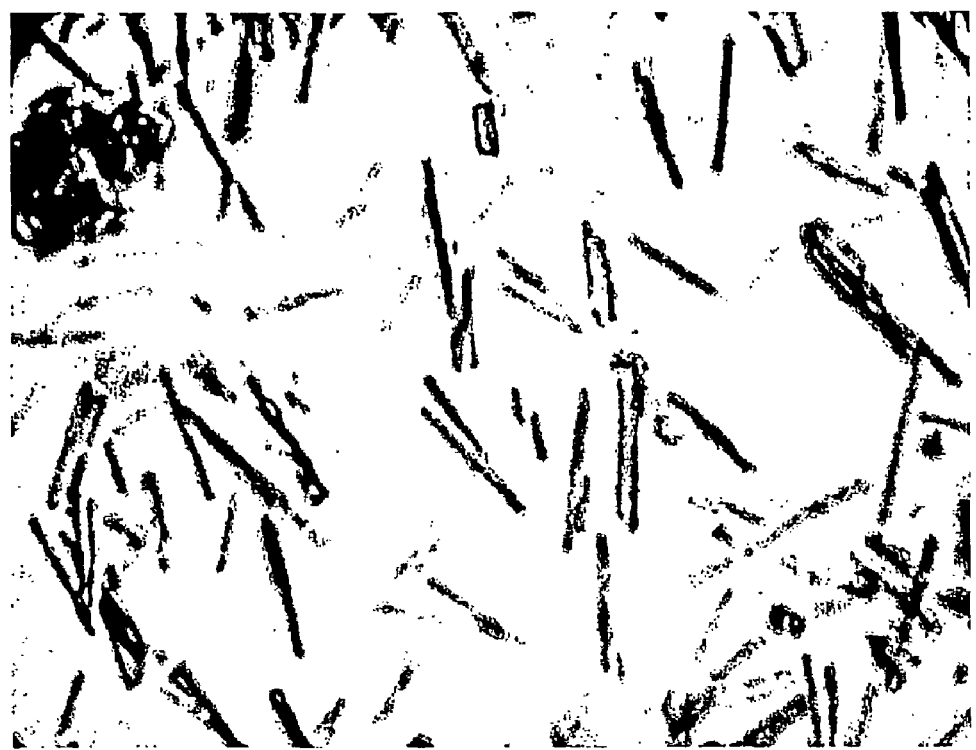
FIG. 12 is a magnified image of crystalline adipic acid produced in accordance with the process of the present invention.

Adipic acid (0.9 g) as a white crystalline solid was obtained. The adipic acid had a slightly grittier consistency than the product of Example 1(a). The crystalline solid had a particle size range of 10-20 microns when observed under a microscope. An enhanced image of the crystalline form is shown in FIG. 12.

The smaller particle size and higher product yield using the two-stage mixing process of the present invention, compared to single-stage mixing, indicate that faster and more intimate mixing was achieved by the process of the present invention.

EXAMPLE 2

The experiment of Example 1 was repeated using a solution containing 2% w/v silver nitrate in methanol (10 ml) in place of adipic acid. As in Example 1, direct comparisons were made between (a) a single-stage mixing nozzle and (b) the improved two-stage mixing nozzle of the present invention.

Single-Stage Mixing

The single-stage mixing yielded no product on the in-line filter. However, traces of fine crystalline powder were observed in the pipe work immediately after the filter. This is a strong indication that speed and efficiency of mixing within the mixing zone of the nozzle were inadequate, thereby resulting in particle formation in the pipe work after the filter.

Two-Stage Mixing

Figure 13:
FIG. 13 is a magnified image of crystalline silver nitrate produced in accordance with the process of the present invention.

A two-stage mixing process in accordance with the process of the present invention yielded particles, having a size in the range of sub 1 micron to 3 microns, on the filter. An enhanced image of the crystalline form is shown in FIG. 13.

EXAMPLE 3

The experiment of Example 1 was repeated using a solution containing 10% w/v p-hydroquinone(1,4,benzenediol supplied by Aldrich) in methanol (10 ml) in place of adipic acid.

The two-stage mixing produced a white crystalline product in 75% yield having a particle size in the range of 1 to 20 microns. The single-stage mixing produced in comparison an extremely small quantity (less than 25% yield) of a rod-shaped product having a particle size in the range of 10 to 90 microns.

Figure 14:
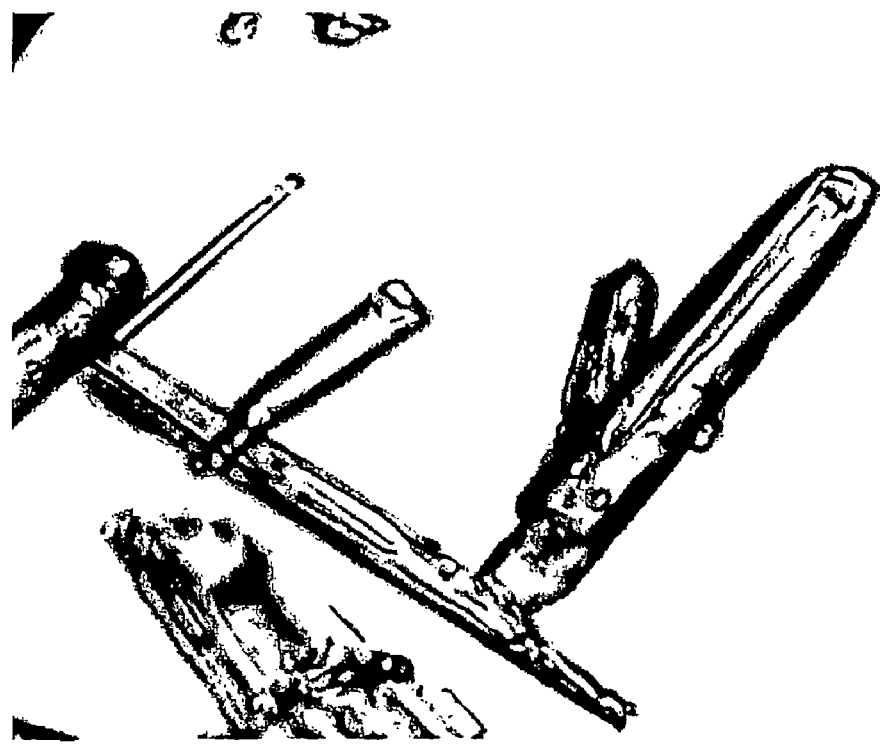
FIG. 14a is a comparative magnified image of crystalline p-hydroquinone produced by single stage mixing.
FIG. 14b is a magnified image of p-hydroquinone produced by two stage mixing in accordance with the process of the present invention.
Figure 14:

Examination of the products showed that the two-stage mixing in accordance with the present invention produced finer particles in a higher yield than the comparative single-stage mixing. The crystal integrity of both products was maintained. These findings are clearly illustrated by comparing the enhanced image of the crystalline form produced by the single stage mixing (FIG. 14a) with the image from the two stage mixing (FIG. 14b).

EXAMPLE 4

The experiment of Example 1 was repeated using a solution containing 2% w/v pharmaceutical active agent, namely Ropinirol, in methanol (10 ml) in place of adipic acid.

The two stage mixing produced a white crystalline product having a particle size in the range of 3 to 9 microns. The one stage mixing produced a crystalline product having a particle size in the range of 5 to 40 microns.

Figure 15:
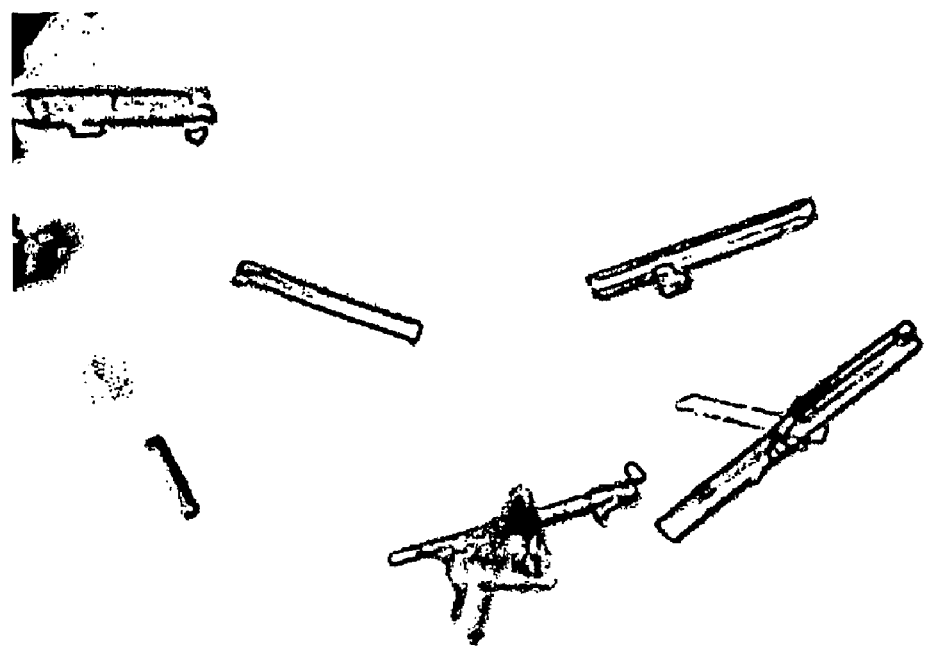
FIG. 15a is a comparative magnified image of crystalline pharmaceutical active agent produced by single stage mixing.
FIG. 15b is a magnified image of pharmaceutical active agent produced by two stage mixing in accordance with the process of the present invention.
Figure 15:
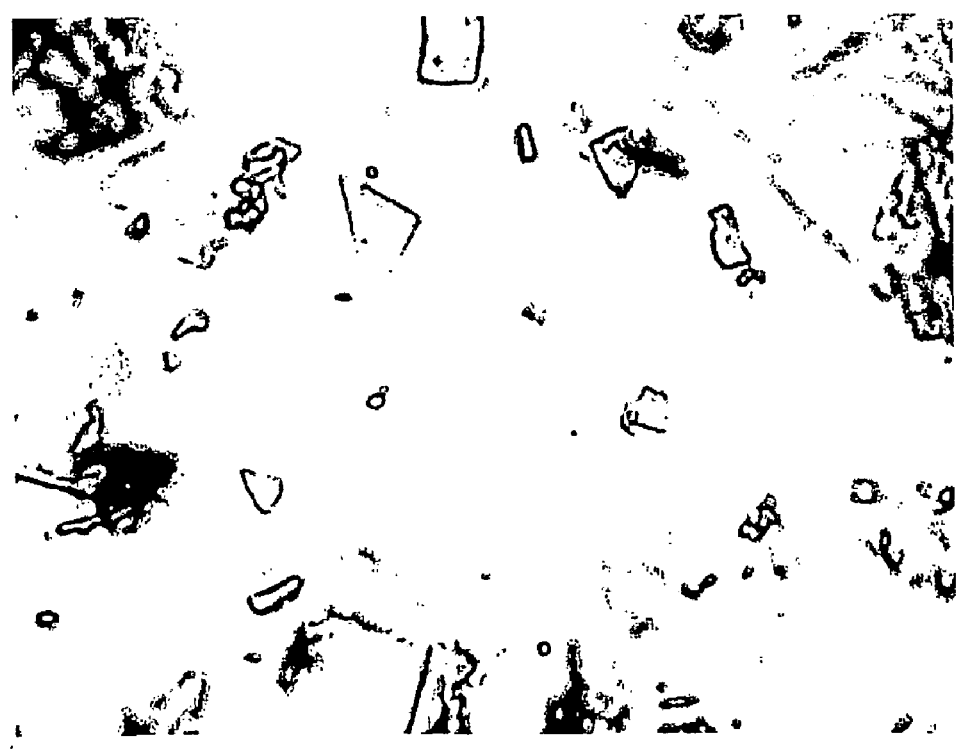

Examination of the products showed that the two-stage mixing in accordance with the present invention produced finer particles in a higher yield than the comparative single-stage mixing, as illustrated by comparing the enhanced image of FIG. 15a (single stage mixing) with that of FIG. 15b (dual stage mixing). The crystal integrity of both products was maintained.

EXAMPLE 5

Addition of a Surfactant

Figure 16:
FIG. 16 is a magnified image of crystalline adipic acid produced in accordance with the process of the present invention including a surfactant.

The experiment of Example 1(a) (single-stage mixing) was repeated except that 1% w/w of Brij 30 (supplied by Aldrich) was added to the 10% w/v solution of adipic in ethanol. The single-stage mixing produced a crystalline product in a yield of 90%. The product was observed to exhibit a well defined and uniform crystal habit, as illustrated in FIG. 16, with a sub 10 micron size. This experiment demonstrates that the inclusion of a surfactant promotes higher yields of product formation and smaller particle size formation.

EXAMPLE 6

Addition of a Surfactant

The experiment of Example 5 was repeated except 1% w/w of Brij 30 was replaced with 1% w/w of Antorox B12 DF surfactant supplied by Rhodia. The single-stage mixing produced a rod-shaped crystalline product having a particle size in the range of 20-200 microns.

EXAMPLE 7

Co-Precipitation

Figure 17:
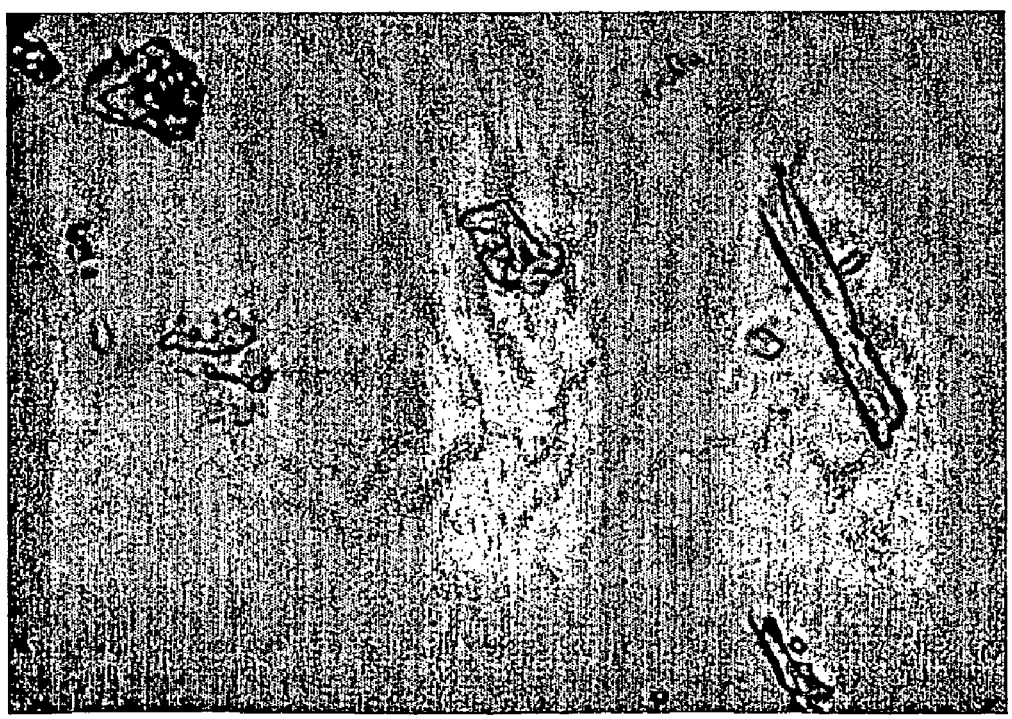
FIG. 17 is a magnified image of a homogenous mixture of crystalline adipic acid and copper sulphate produced in accordance with the process of the present invention.

A solution containing 5% w/v of adipic acid and 5% w/v of copper sulphate in methanol (10 ml) was treated as described for Example 1(b) (two-stage mixing) above. A two-stage mixing nozzle was used as illustrated in FIG. 6. Microscopic analysis of the product isolated showed a homogenous mixture of both products (80% yield based on the total weight of adipic acid and copper sulphate), as illustrated in FIG. 17, wherein the particle size of the copper sulphate is in the range of 2 to 5 microns and the particle size of the adipic acid is in the range of 5 to 40 microns.

EXAMPLE 8

Co-Precipitation

A solution containing salicylic acid (20% w/v) and adipic acid (3% w/v) was prepared in acetone (10 ml) and treated using the two-stage mixing process and apparatus used in Example 1(b).

Figure 18:
FIG. 18 is a magnified image of a homogenous mixture of crystalline salicylic acid and adipic acid produced in accordance with the process of the present invention.

Microscopic examination of the product isolated showed a uniform and homogenous mixture of both products in their true crystal habit, as illustrated in FIG. 18. Particle size of the salicylic acid constituent was below 3 microns and the adipic acid around 10 microns.

EXAMPLE 9

Co-Precipitation of Co-Codamol

Figure 19:
FIG. 19 is a magnified image of a homogenous crystalline mixture of a paracetamol and codeine produced in accordance with the process of the present invention.

A solution containing 6% w/v of paracetamol (N-acetyl-p-aminophenol) and codeine 0.1% w/v in methanol (10 ml) was treated as described for Example 1(b) (two-stage mixing) above, using a two-stage mixer as illustrated in FIG. 6. Microscopic analysis of the product isolated showed a homogenous mixture of both products, as illustrated in FIG. 19, having a crystal size of sub 1 micron.

EXAMPLE 10

The experiment of example 1(b) was repeated using a solution containing 5.7% w/v of ibuprofen (2-(p-isobutyl) propionic acid) in methanol (10 ml) in place of adipic acid.

The two-stage mixing produced a white crystalline product.

EXAMPLE 11

Addition of a Surfactant

Figure 20:
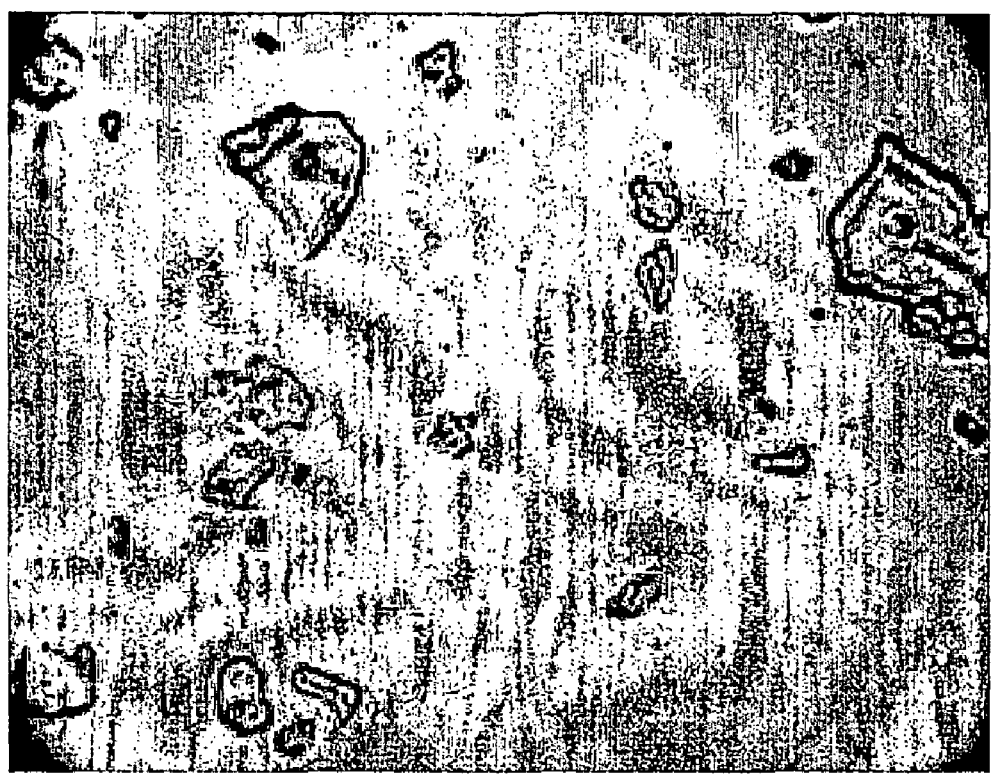
FIG. 20 is a magnified image of crystalline paracetamol produced in accordance with the process of the present invention including a surfactant.

The experiment of Example 1(b) (two-stage mixing) was repeated using 8% w/v of paracetamol in methanol (10 ml) and 1% w/w of Brij 30 in place of adipic acid. The two-stage mixing produced a product having a uniform crystalline habit, as illustrated in FIG. 20, with a sub 3 micron size.

EXAMPLE 12

Use of R227ea(1,1,1,2,3,3,3-heptafluoropropane) as Anti-Solvent

By a process analogous to the processes described above, R227a was used as the anti-solvent which was contacted with a solution of a proprietary pharmaceutical compound in methanol (3% w/v). The product was recovered and microscopic examination showed that crystal sizes of sub 5 μm were obtained.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

The invention claimed is:

1. A process for preparing particles of a substance, said process comprising
    providing a mixer having a first inlet connected to a first solvent source comprising a first solvent being a $C_{1-4}$ hydrofluorocarbon with a boiling point less than 20° C. and more than −90° C., having a second inlet connected to a second solvent source comprising a second solvent being a $C_{1-4}$ hydrofluorocarbon with a boiling point less than 20° C. and more than −90° C., having a third inlet connected to a source of a first formulation being a solution of the substance in a carrier solvent, and having an outlet connectable to a separation means for separating particles of the first substance from the first and second solvents, and
    extracting the carrier solvent from the formulation and precipitating the substance as particles by introducing said first formulation in the form of a stream into said mixer via said third inlet,
    introducing said first solvent in the form of a stream into said mixer via said first inlet at a rate such as to contact 1 volume of said formulation with greater than or equal to 1 volume of said first solvent to thereby form a mixture of the first formulation and the first solvent, and subsequently
    introducing said second solvent in the form of a stream into said mixer via said second inlet at a rate such as to contact 1 volume of the so-formed mixture of the first formulation and the first solvent with 8-25 volumes of said second solvent, the pressure of the first and second streams of $C_{1-4}$ hydrofluorocarbon solvent being 1 to 5 bar G above the vapour pressure of the $C_{1-4}$ hydrofluorocarbon solvent at the operating temperature, the substance being insoluble or only sparingly soluble in the first and second solvent streams, thereby
    causing formation of solid particles of the first substance by extraction of the carrier solvent and precipitation, wherein both the first and second solvent streams are in a non-supercritical state, and
    subjecting the resultant mixture to a separation process which causes separation of the first substance from the mixture of carrier solvent and first and second solvent streams;
    and wherein contact between the first formulation and the first solvent stream is achieved by means of a mixer comprising three concentric tubes, a first of said concentric tubes being connected to the said first inlet for said first solvent, a second of said concentric tubes being connected to the said second inlet for said second solvent, a third of said concentric tubes being connected to the said third inlet for said first formulation, each of said three concentric tubes having an outlet, wherein the first solvent stream is fed through said first of said three concentric tubes, the second solvent stream is fed through said second of said three concentric tubes, and the first formulation is fed through the third of said three concentric tubes, and the outlets of the three concentric tubes are designed to effect contact between the first formulation, the first solvent stream and the second solvent stream.

2. A process as claimed in claim 1 further including the step of contacting the first formulation, the first and second solvent streams with a second formulation including a second substance thereby forming particles of the first substance and the second substance, and subjecting the resultant mixture to a separation process thereby causing separation of the first and second substances from the first and second solvent streams.

3. A process as claimed in claim 2 wherein the first formulation is contacted with the first solvent stream to form a mixture of the first formulation and the first solvent stream, the mixture of the first formulation and the first solvent stream is contacted with the second formulation and the second solvent stream thereby causing formation of particles of the first substance and the second substance, and the resultant mixture is subjected to a separation process thereby causing separation of the first and second substances from the first and second solvent streams.

4. A process as claimed in claim 3 wherein the mixture of the first formulation and the first solvent stream is contacted simultaneously with the second formulation and the second solvent stream.

5. A process as claimed in claim 3 wherein the second formulation is contacted with the second solvent stream to form a mixture of the second formulation and the second solvent stream, and the mixture of the second formulation and the second solvent stream is contacted with the mixture of the first formulation and the first solvent stream, thereby causing formation of particles of the first substance and the second substance.

6. A process as claimed in claim 2 wherein the first formulation is contacted with the first solvent stream and the second formulation to form a mixture of the first formulation, the second formulation and the first solvent stream, and the mixture of the first formulation, the second formulation and the first solvent stream is then contacted with the second solvent stream, thereby causing formation of particles of the first substance and the second substance.

7. A process as claimed in claim 2 further including the step of contacting the first formulation, the second formulation, the first solvent stream and the second solvent stream with a third stream of a $C_1$-$C_4$ hydrofluorocarbon solvent with a boiling point less than 20° C. and more than −90° C. in a non-supercritical state. The substance being insoluble or only sparingly soluble in the third solvent stream thereby causing formation of particles of the first and second substances, and subjecting the resultant mixture to a separation process thereby causing separation of the first and second substances from the first, second and third solvent streams.

8. A process as claimed in claim 7 wherein the first formulation is contacted with the first and second solvent streams to form a mixture of the first formulation and the first and second solvent streams, the second formulation is contacted with the third solvent stream to form a mixture of the second formulation and the third solvent stream, and the mixture of the first formulation and the first and second solvent streams is contacted with the mixture of the second formulation and the third solvent stream thereby causing formation of particles of the first and second substances.

9. A process as claimed in claim 1 wherein the first formulation and/or first solvent stream and/or second solvent stream include a surfactant.

10. A process as claimed in claim 2 wherein the second formulation is introduced to the process as a stream which includes a surfactant.

11. A process as claimed in claim 1, wherein the components of the first solvent stream are the same as the components of the second solvent stream.

12. A process as claimed in claim 1 wherein the first formulation includes an organic solvent.

13. A process as claimed in claim 2 wherein the second formulation includes an organic solvent.

14. A process as claimed in claim 2 wherein the second substance is selected from flavours, fragrances, plastics, pigments, dyes, biologically active compounds, or an additive selected from any one of the combination of: stabilizer; dispersion agents; surfactants; taste enhancing or masking additives; antioxidants and hygroscopic prevention agents.

15. A process as claimed in claim 1 wherein the first substance is selected from flavours, fragrances, plastics, pigments, dyes and biologically active compounds, especially a biologically active compound.

16. A process as claimed in claim 1 wherein the separation process includes collecting the solid particles of the substance(s) on a filter.

17. A process as claimed in claim 1 wherein the first formulation further includes a second substance.

18. A process as claimed in claim 1 wherein the first formulation comprises a blend of two or more solutions.

19. A process according to claim 1 wherein 1 volume of the first formulation is contacted with less than or equal to 7 volumes of the first stream of the C1-C4 hydrofluorocarbon solvent.

20. A process according to claim 19 wherein the combined first stream of the C1-C4 hydrofluorocarbon solvent and first formulation is contacted with greater than or equal to 10 volumes of the second stream of the C1-C4 hydrofluorocarbon solvent.

21. A process for preparing particles of a substance, said process comprising
providing a mixer having a first inlet connected to a first solvent source comprising a first solvent being a $C_{1-4}$ hydrofluorocarbon with a boiling point less than 20° C. and more than −90° C., having a second inlet connected to a second solvent source comprising a second solvent being a $C_{1-4}$ hydrofluorocarbon with a boiling point less than 20° C. and more than −90° C., having a third inlet connected to a source of a first formulation being a solution of the substance in a carrier solvent, and having an outlet connectable to a separation means for separating particles of the first substance from the first and second solvents, and
extracting the carrier solvent from the formulation and precipitating the substance as particles by introducing said first formulation in the form of a stream into said mixer via said third inlet,
introducing said first solvent in the form of a stream into said mixer via said first inlet at a rate such as to contact 1 volume of said formulation with greater than or equal to 1 volume of said first solvent to thereby form a mixture of the first formulation and the first solvent, and subsequently
introducing said second solvent in the form of a stream into said mixer via said second inlet at a rate such as to contact 1 volume of the so-formed mixture of the first formulation and the first solvent with 8-25 volumes of said second solvent, the pressure of the first and second streams of $C_{1-4}$ hydrofluorocarbon solvent being 1 to 5 bar G above the vapour pressure of the $C_{1-4}$ hydrofluorocarbon solvent at the operating temperature, the substance being insoluble or only sparingly soluble in the first and second solvent streams, thereby
causing formation of solid particles of the first substance by extraction of the carrier solvent and precipitation, wherein both the first and second solvent streams are in a non-supercritical state, and
subjecting the resultant mixture to a separation process which causes separation of the first substance from the mixture of carrier solvent and first and second solvent streams; and wherein contact between the first formulation and the first solvent stream is achieved by means of a mixer comprising two concentric tubes, a first of said concentric tubes being connected to the said first inlet for said first solvent, a second of said concentric tubes being connected to the said third inlet for said first formulation, each of said two concentric tubes having an outlet, wherein the first solvent stream is fed through said first of said two concentric tubes and the first formulation is fed through the second of said two concentric tubes, and the outlets of the two concentric tubes are designed to effect contact between the first formulation and the first solvent stream.

22. A process as claimed in claim 21 further including the step of contacting the first formulation, the first and second solvent streams with a second formulation including a second substance thereby forming particles of the first substance and the second substance, and subjecting the resultant mixture to a separation process thereby causing separation of the first and second substances from the first and second solvent streams.

23. A process as claimed in claim 21 wherein the first formulation is contacted with the first solvent stream to form a mixture of the first formulation and the first solvent stream, the mixture of the first formulation and the first solvent stream is contacted with the second formulation and the second solvent stream thereby causing formation of particles of the first substance and the second substance, and the resultant mixture is subjected to a separation process thereby causing separation of the first and second substances from the first and second solvent streams.

24. A process as claimed in claim 23 wherein the mixture of the first formulation and the first solvent stream is contacted simultaneously with the second formulation and the second solvent stream.

25. A process as claimed in claim 23 wherein the second formulation is contacted with the second solvent stream to form a mixture of the second formulation and the second solvent stream, and the mixture of the second formulation and the second solvent stream is contacted with the mixture of the first formulation and the first solvent stream, thereby causing formation of particles of the first substance and the second substance.

26. A process as claimed in claim 22 wherein the first formulation is contacted with the first solvent stream and the second formulation to form a mixture of the first formulation, the second formulation and the first solvent stream, and the mixture of the first formulation, the second formulation and the first solvent stream is then contacted with the second solvent stream, thereby causing formation of particles of the first substance and the second substance.

27. A process as claimed in claim 22 further including the step of contacting the first formulation, the second formulation, the first solvent stream and the second solvent stream with a third stream of a $C_1$-$C_4$ hydrofluorocarbon with a boiling point less than 20° C. and more than −90° C. in a non-supercritical state, the substance being insoluble or only sparingly soluble in the third solvent stream thereby causing formation of particles of the first and second substances, and subjecting the resultant mixture to a separation process thereby causing separation of the first and second substances from the first, second and third solvent streams.

28. A process as claimed in claim 27 wherein the first formulation is contacted with the first and second solvent streams to form a mixture of the first formulation and the first and second solvent streams, the second formulation is contacted with the third solvent stream to form a mixture of the second formulation and the third solvent stream, and the mixture of the first formulation and the first and second solvent streams is contacted with the mixture of the second formulation and the third solvent stream thereby causing formation of particles of the first and second substances.

29. A process as claimed in claim 21 wherein the first formulation and/or first solvent stream and/or second solvent stream include a surfactant.

30. A process as claimed in claim 22 wherein the second formulation is introduced to the process as a stream which includes a surfactant.

31. A process as claimed in claim 21, wherein the components of the first solvent stream are the same as the components of the second solvent stream.

32. A process as claimed in claim 21, wherein the first formulation includes an organic solvent.

33. A process as claimed in claim 22, wherein the second formulation includes an organic solvent.

34. A process as claimed in claim 22, wherein the second substance is selected from flavours, fragrances, plastics, pigments, dyes, biologically active compounds, or an additive selected from any one of the combination of: stabilizer; dispersion agents; surfactants; taste enhancing or masking additives; antioxidants and hydroscopic prevention agents.

35. A process as claimed in claim 21 wherein the first substance is selected from flavours, fragrances, plastics, pigments, dyes and biologically active compounds.

36. A process as claimed in claim 21, wherein the separation process includes collecting the solid particles of the substance(s) on a filter.

37. A process as claimed in claim 21 wherein the first formulation further includes a second substance.

38. A process as claimed in claim 21 wherein the first formulation comprises a blend of two or more solutions.

39. A process according to claim 21 wherein 1 volume of the first formulation is contacted with less than or equal to 7 volumes of the first stream of the $C_1$-$C_4$ hydrofluorocarbon solvent.

40. A process according to claim 21 wherein the combined stream of the $C_1$-$C_4$ hydrofluorocarbon solvent and first formulation is contacted with greater than or equal to 10 volumes of the second stream of the $C_1$-$C_4$ hydrofluorocarbon solvent.

41. A process for preparing particles of a substance, said process comprising
providing a mixer having a first inlet connected to a first solvent source comprising a first solvent being a $C_{1-4}$ hydrofluorocarbon with a boiling point less than 20° C. and more than −90° C., having a second inlet connected to a second solvent source comprising a second solvent being a $C_{1-4}$ hydrofluorocarbon with a boiling point less than 20° C. and more than −90° C., having a third inlet connected to a source of a first formulation being a solution of the substance in a carrier solvent, and having an outlet connectable to a separation means for separating particles of the first substance from the first and second solvents, and
extracting the carrier solvent from the formulation and precipitating the substance as particles by introducing said first formulation in the form of a stream into said mixer via said third inlet,
introducing said first solvent in the form of a stream into said mixer via said first inlet at a rate such as to contact 1 volume of said formulation with greater than or equal to 1 volume of said first solvent to thereby form a mixture of the first formulation and the first solvent, and subsequently
introducing said second solvent in the form of a stream into said mixer via said second inlet at a rate such as to contact 1 volume of the so-formed mixture of the first formulation and the first solvent with 8-25 volumes of said second solvent, the pressure of the first and second streams of $C_{1-4}$ hydrofluorocarbon solvent being 1 to 5 bar G above the vapour pressure of the $C_{1-4}$ hydrofluorocarbon solvent at the operating temperature, the substance being insoluble or only sparingly soluble in the first and second solvent streams, thereby
causing formation of solid particles of the first substance by extraction of the carrier solvent and precipitation, wherein both the first and second solvent streams are in a non-supercritical state, and
subjecting the resultant mixture to a separation process which causes separation of the first substance from the mixture of carrier solvent and first and second solvent streams wherein the first and second inlets introduce the respective streams of first and second solvent into the mixer in opposite flow directions so that the first and second solvent streams contact each other in a head to head relationship.

42. A process as claimed in claim 21 further including the step of contacting the first formulation, the first and second solvent streams with a second formulation including a second substance thereby forming particles of the first substance and the second substance, and subjecting the resultant mixture to a separation process thereby causing separation of the first and second substances from the first and second solvent streams.

43. A process as claimed in claim 42 wherein the first formulation is contacted with the first solvent stream to form a mixture of the first formulation and the first solvent stream, the mixture of the first formulation and the first solvent stream is contacted with the second formulation and the second solvent stream thereby causing formation of particles of the first substance and the second substance, and the resultant mixture is subjected to a separation process thereby causing separation of the first and second substances from the first and second solvent streams.

44. A process as claimed in claim 43 wherein the mixture of the first formulation and the first solvent stream is contacted simultaneously with the second formulation and the second solvent stream.

45. A process as claimed in claim 43 wherein the second formulation is contacted with the second solvent stream to form a mixture of the second formulation and the second solvent stream, and the mixture of the second formulation and the second solvent stream is contacted with the mixture of the first formulation and the first solvent stream, thereby causing formation of particles of the first substance and the second substance.

46. A process as claimed in claim 42 wherein the first formulation is contacted with the first solvent stream and the second formulation to form a mixture of the first formulation, the second formulation and the first solvent stream, and the mixture of the first formulation, the second formulation and the first solvent stream is then contacted with the second solvent stream, thereby causing formation of particles of the first substance and the second substance.

47. A process as claimed in claim 42 further including the step of contacting the first formulation, the second formulation, the first solvent stream and the second solvent stream with a third stream of a $C_1$-$C_4$ hydrofluorocarbon with a boiling point less than 20° C. and more than −90° C. in a non-supercritical state, the substance being insoluble or only sparingly soluble in the third solvent stream thereby causing formation of particles of the first and second substances, and subjecting the resultant mixture to a separation process thereby causing separation of the first and second substances from the first, second and third solvent streams.

48. A process as claimed in claim 47 wherein the first formulation is contacted with the first and second solvent streams to form a mixture of the first formulation and the first and second solvent streams, the second formulation is contacted with the third solvent stream to form a mixture of the second formulation and the third solvent stream, and the mixture of the first formulation and the first and second solvent streams is contacted with the mixture of the second formulation and the third solvent stream thereby causing formation of particles of the first and second substances.

49. A process as claimed in claim 41 wherein the first formulation and/or first solvent stream and/or second solvent stream include a surfactant.

50. A process as claimed in claim 42 wherein the second formulation is introduced to the process as a stream which includes a surfactant.

51. A process as claimed in claim 41, wherein the components of the first solvent stream are the same as the components of the second solvent stream.

52. A process as claimed in claim 41, wherein the first formulation includes an organic solvent.

53. A process as claimed in claim 42, wherein the second formulation includes an organic solvent.

54. A process as claimed in claim 42, wherein the second substance is selected from flavours, fragrances, plastics, pigments, dyes, biologically active compounds, or an additive selected from any one of the combination of: stabilizer; dispersion agents; surfactants; taste enhancing or masking additives; antioxidants and hydroscopic prevention agents.

55. A process as claimed in claim 41 wherein the first substance is selected from flavours, fragrances, plastics, pigments, dyes and biologically active compounds.

56. A process as claimed in claim 41, wherein the separation process includes collecting the solid particles of the substance(s) on a filter.

57. A process as claimed in claim 41 wherein the first formulation further includes a second substance.

58. A process as claimed in claim 41 wherein the first formulation comprises a blend of two or more solutions.

59. A process according to claim 41 wherein 1 volume of the first formulation is contacted with less than or equal to 7 volumes of the first stream of the $C_1$-$C_4$ hydrofluorocarbon solvent.

60. A process according to claim 41 wherein the combined stream of the $C_1$-$C_4$ hydrofluorocarbon solvent and first formulation is contacted with greater than or equal to 10 volumes of the second stream of the $C_1$-$C_4$ hydrofluorocarbon solvent.

* * * * *